(12) United States Patent
Wakabayashi

(10) Patent No.: US 7,995,913 B2
(45) Date of Patent: Aug. 9, 2011

(54) ELECTRONIC CAMERA

(75) Inventor: Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 774 days.

(21) Appl. No.: 11/798,892

(22) Filed: May 17, 2007

(65) Prior Publication Data

US 2007/0274702 A1  Nov. 29, 2007

(30) Foreign Application Priority Data

May 23, 2006 (JP) ................................. 2006-142725

(51) Int. Cl.
*G03B 7/00* (2006.01)
*G03B 7/08* (2006.01)
(52) U.S. Cl. ..... 396/213; 396/237; 396/245; 348/221.1; 348/229.1
(58) Field of Classification Search .................. 396/213, 396/215, 63, 64, 155, 161, 237, 245; 348/221.1, 348/229.1
See application file for complete search history.

(56) References Cited

U.S. PATENT DOCUMENTS

| 7,012,638 B1 | 3/2006 | Yokonuma |
| 2005/0219381 A1 * | 10/2005 | Takeuchi et al. ........... 348/229.1 |

FOREIGN PATENT DOCUMENTS

| JP | A 2001-094854 | 4/2001 |
| JP | A 2003-189175 | 7/2003 |
| JP | A 2003-224763 | 8/2003 |

* cited by examiner

*Primary Examiner* — Rochelle-Ann J Blackman
(74) *Attorney, Agent, or Firm* — Oliff & Berridge, PLC

(57) ABSTRACT

An electronic camera and method include an imaging device, a luminance detection device, a selection device, a first control circuit, a second control circuit and a third control circuit. The first control circuit re-executes an exposure calculation by adjusting the exposure sensitivity if a first control exposure determined in the first mode does not achieve the optimal exposure. The second control circuit automatically sets the exposure sensitivity at the imaging device in correspondence to a subject luminance detected by the luminance detection device. The third control circuit disallows the second control circuit from operating and allows the first control circuit to operate when the first mode is selected, and that disallows the first control circuit from operating and allows the second control circuit to operate when the second mode is selected.

11 Claims, 22 Drawing Sheets

ELECTRONIC CAMERA

INCORPORATION BY REFERENCE

The disclosure of the following priority application is herein incorporated by reference:

Japanese Patent Application No. 2006-142725 filed May 23, 2006

BACKGROUND OF THE INVENTION

1. Field of the Invention

The present invention relates to an electronic camera.

2. Description of Related Art

Japanese Laid Open Patent Publication No. 2003-189175 and Japanese Laid Open Patent Publication No. 2001-94854 respectively disclose a technology (hereafter referred to as "first control"), whereby exposure calculation is executed based upon the exposure sensitivity set at an imaging device and the subject luminance and if the optimal exposure is not achieved as a result of the initial exposure calculation, exposure calculation is executed again by adjusting the exposure sensitivity, and a technology (hereafter referred to as "second control"), whereby a specific exposure sensitivity level is selected at an imaging device in correspondence to the subject luminance.

When the first control and the second control are adopted in combination in an electronic camera, confusion may occur as the settings selected in the first control may not be easily distinguishable from those in the second control.

SUMMARY OF THE INVENTION

An electronic camera according to a first aspect of the present invention includes: an imaging device that captures a subject image through a photographic lens; a luminance detection device that detects subject luminance; a first arithmetic operation circuit that executes exposure calculation by using at least exposure sensitivity set at the imaging device and the subject luminance detected by the luminance detection device among the exposure sensitivity set at the imaging device, an exposure time period set at the imaging device, an aperture value set at the photographic lens and the subject luminance detected by the luminance detection device and determines through arithmetic operation a first control exposure by adjusting at least one of the exposure time period and the aperture value so as to achieve optimal exposure if the optimal exposure is not achieved through the initial exposure calculation: a second arithmetic operation circuit that determines through arithmetic operation a second control exposure with regard to the aperture value and the exposure time period so as to achieve the optimal exposure in correspondence to the exposure sensitivity set at the imaging device and the subject luminance detected by the luminance detection device; a first control circuit that controls the first arithmetic operation circuit so as to execute the exposure calculation again by adjusting the exposure sensitivity if calculation results provided by the first arithmetic operation circuit do not achieve the optimal exposure: a second control circuit that sets the exposure sensitivity at the imaging device in correspondence to the subject luminance detected by the luminance detection device; and a third control circuit that individually controls the first arithmetic operation circuit, the second arithmetic operation circuit, the first control circuit and the second control circuit such that one of the first arithmetic operation circuit and the second arithmetic operation circuit is selected in response to a first instruction, that engagement of the second control circuit is disallowed and engagement of the first control circuit is allowed in response to a second instruction when the first arithmetic operation circuit is selected and that engagement of the first control circuit is disallowed and engagement of the second control circuit is allowed in response to a third instruction when the second arithmetic operation circuit is selected.

According to a 2nd aspect of the present invention, in the electronic camera according to the first aspect, it is preferable that the third instruction is output from a sensitivity setting operation member operated to set the exposure sensitivity at the imaging device.

According to a 3rd aspect of the present invention, the electronic camera according to the 2nd aspect, it is preferable that the second instruction is output from an operation member other than the sensitivity setting operation member.

According to a 4th aspect of the present invention, the electronic camera according to the 2nd aspect further includes: a storage device in which information indicating the exposure sensitivity having been set most recently with the first arithmetic operation circuit selected and information indicating contents of an instruction having been most recently issued via the sensitivity setting operation member with the second arithmetic operation circuit selected are stored. And it is preferable that (1) the third control circuit selects the first arithmetic operation circuit instead of the second arithmetic operation circuit and sets the most recent exposure sensitivity indicated in the information stored in the storage device as the exposure sensitivity at the imaging device in response to the first instruction received when the second arithmetic operation circuit is selected and engagement of the second control circuit is allowed; and (2) the third control circuit selects the first arithmetic operation circuit instead of the second arithmetic operation circuit and sets exposure sensitivity corresponding to the contents of the most recent instruction issued via the sensitivity setting operation member, indicated in the information stored in the storage device, as the exposure sensitivity at the imaging device in response to the first instruction received when the second arithmetic operation circuit is selected and engagement of the second control circuit is not allowed.

According to a 5th aspect of the present invention, in the electronic camera according to the 4th aspect, the third control circuit may select the first arithmetic operation circuit instead of the second arithmetic operation circuit and set the exposure sensitivity at the imaging device to a predetermined sensitivity level if information indicating the most recent exposure sensitivity having been set with the first arithmetic operation circuit selected or information indicating the most recent exposure sensitivity having been set with the second arithmetic operation circuit selected is not stored in the storage device, in response to the first instruction received when the second arithmetic operation circuit is selected and engagement of the second control circuit is allowed.

According to a 6th aspect of the present invention, the electronic camera according to the 2nd aspect may further include a storage device in which information indicating the exposure sensitivity having been set most recently with the first arithmetic operation circuit selected and information indicating contents of an instruction having been most recently issued via the sensitivity setting operation member with the second arithmetic operation circuit selected are stored. It may be possible that (1) the third control circuit selects the second arithmetic operation circuit instead of the first arithmetic operation circuit and allows engagement of the second control circuit if information indicating the third instruction is stored in the storage device, in response to the first instruction received when the first arithmetic operation circuit is selected; and (2) the third control circuit selects the second arithmetic operation circuit instead of the first arithmetic operation circuit and sets the most recent exposure sensitivity indicated in the information stored in the storage device as the exposure sensitivity at the imaging device if information indicating the third instruction is not stored in the storage device, in response to the first instruction received when the first arithmetic operation circuit is selected.

According to a 7th aspect of the present invention, in the electronic camera according to the 2nd aspect, it is preferable that the third control circuit disallows engagement of the second control circuit and adjusts the exposure sensitivity from a maximum sensitivity level or a minimum sensitivity level designated as a starting point in response to an instruction for setting the exposure sensitivity output from the sensitivity setting operation member when the second arithmetic operation circuit is selected and engagement of the second control circuit is allowed.

According to a 8th aspect of the present invention, in the electronic camera according to the first aspect, the first control circuit may control the first arithmetic operation circuit so as to adjust the exposure sensitivity by setting the exposure time period to a predetermined value indicating a higher speed than a lower control limit.

According to a 9th aspect of the present invention, the electronic camera according to the 2nd aspect may further includes a storage device in which information indicating the exposure sensitivity having been set most recently with the first arithmetic operation circuit selected and information indicating contents of an instruction having been most recently issued via the sensitivity setting operation member with the second arithmetic operation circuit selected are stored. It may be possible that (1) the third control circuit selects the first arithmetic operation circuit instead of the second arithmetic operation circuit and sets one of the most recent exposure sensitivity indicated in the information stored in the storage device and exposure sensitivity corresponding to the contents of the most recent instruction issued via the sensitivity setting operation member and indicated in the information stored in the storage device, as the exposure sensitivity at the imaging device, in response to the first instruction received when the second arithmetic operation circuit is selected and engagement of the second control circuit is allowed; and (2) the third control circuit selects first arithmetic operation circuit instead of the second arithmetic operation circuit and sets the exposure sensitivity corresponding to the contents of the most recent instruction issued via the sensitivity setting operation member, indicated in the information stored in the storage device, as the exposure sensitivity at the imaging device, in response to the first instruction received when the second arithmetic operation circuit is selected and engagement of the second control circuit is not allowed.

According to a 10th aspect of the present invention, the electronic camera according to the 2nd aspect may further includes a storage device in which information indicating the exposure sensitivity having been set most recently with the first arithmetic operation circuit selected and information indicating contents of an instruction having been most recently issued via the sensitivity setting operation member with the second arithmetic operation circuit is selected are stored. It may be possible that (1) the third control circuit selects the second arithmetic operation circuit instead of the first arithmetic operation circuit and allows engagement of the second control circuit if information indicating the third instruction is stored in the storage device, in response to the first instruction received when the first arithmetic operation circuit is selected; (2) the third control circuit selects the second arithmetic operation circuit instead of the first arithmetic operation circuit and sets one of the most recent exposure sensitivity indicated in the information stored in the storage device and exposure sensitivity corresponding to the contents of the most recent instruction issued via the sensitivity setting operation member and indicated in the information stored in the storage device, as the exposure sensitivity at the imaging device if information indicating the third instruction is not stored in the storage device, in response to the first instruction received when the first arithmetic operation circuit is selected and engagement of the first control circuit is allowed; and (3) the third control circuit selects the second arithmetic operation circuit instead of the first arithmetic operation circuit and sets the most recent exposure sensitivity indicated in the information stored in the storage device as the exposure sensitivity at the imaging device if information indicating the third instruction is not stored in the storage device, in response to the first instruction received when the first arithmetic operation circuit is selected and engagement of the first control circuit is not allowed.

An exposure control method for an electronic camera according to a 11th aspect of the present invention: captures a subject image through a photographic lens with an imaging device; detects subject luminance with a luminance detection device; performs a first arithmetic operation that executes exposure calculation by using at least exposure sensitivity set at the imaging device and the subject luminance detected by the luminance detection device among the exposure sensitivity set at the imaging device, an exposure time period set at the imaging device, an aperture value set at the photographic lens and the subject luminance detected by the luminance detection device and determines through arithmetic operation a first control exposure by adjusting at least one of the exposure time period and the aperture value so as to achieve optimal exposure if the optimal exposure is not achieved through the initial exposure calculation, performs a second arithmetic operation that determines through arithmetic operation a second control exposure with regard to the aperture value and the exposure time period so as to achieve the optimal exposure in correspondence to the exposure sensitivity set at the imaging device and the subject luminance detected by the luminance detection device; performs a first control that controls the first arithmetic operation to execute the exposure calculation again by adjusting the exposure sensitivity if calculation results provided by the first arithmetic operation do not achieve the optimal exposure; performs a second control that sets the exposure sensitivity at the imaging device in correspondence to the subject luminance detected by the luminance detection device; and performs a third control that individually controls the first arithmetic operation, the second arithmetic operation, the first control and the second control such that one of the first arithmetic operation and the second arithmetic operation is selected in response to a first instruction, that engagement of the second control is disallowed and engagement of the first control is allowed in response to a second instruction when the first arithmetic operation is selected and that engagement of the first control is disallowed and engagement of the second control is allowed in response to a third instruction when the second arithmetic operation is selected.

DESCRIPTION OF PREFERRED EMBODIMENTS

Figure 1:
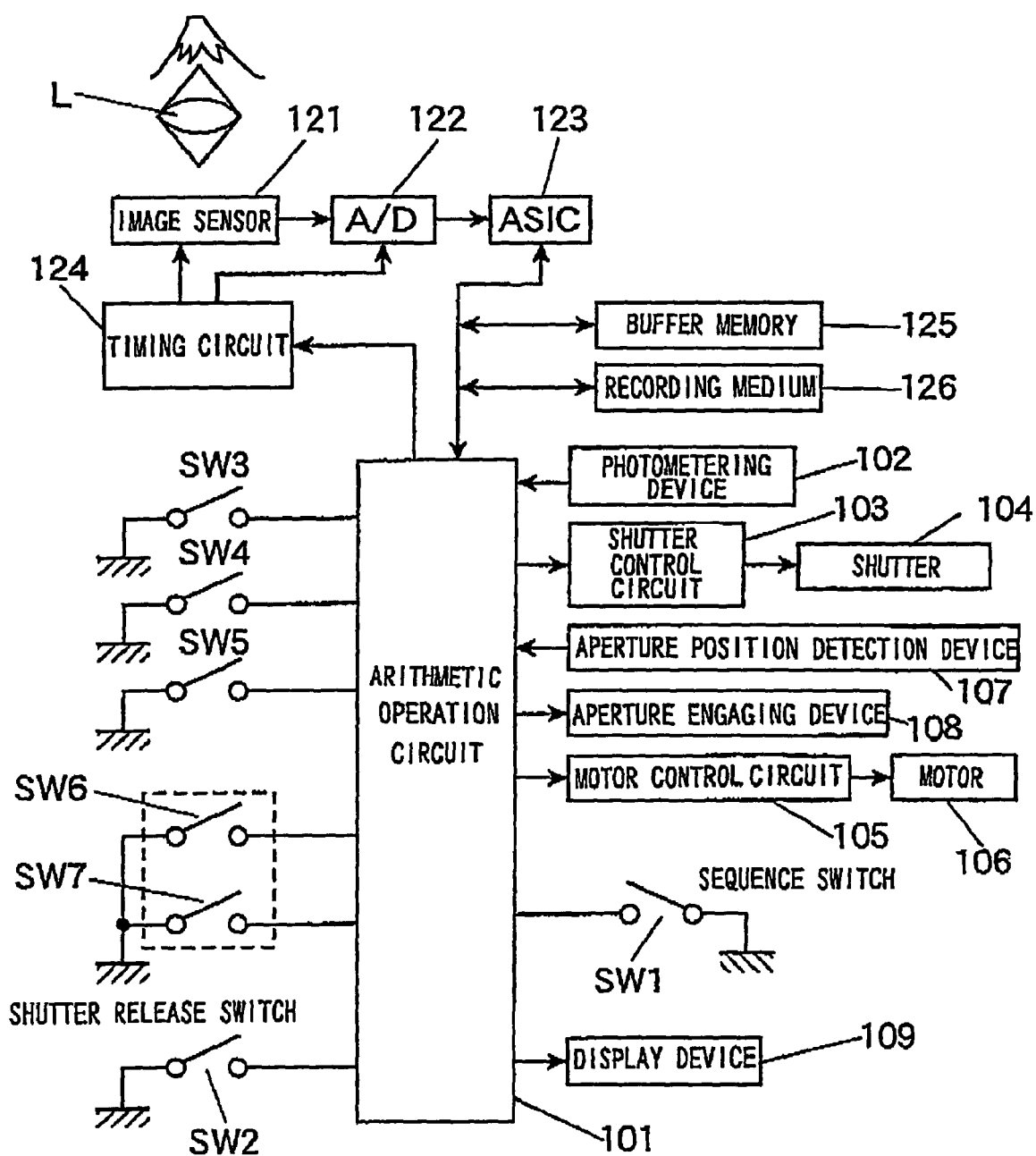
FIG. 1 is a block diagram showing the structure adopted in an electronic camera achieved in an embodiment of the present invention.

The following is an explanation of the best mode for carrying out the present invention given in reference to the drawings. FIG. 1 is a block diagram showing the structure adopted in an electronic camera achieved in an embodiment of the present invention. An arithmetic operation circuit 101 in FIG. 1 is constituted with a microcomputer and the like. The arithmetic operation circuit 101 executes a specific arithmetic operation based upon signals input thereto from various blocks to be detailed later and outputs control signals to the individual blocks based upon the results of the arithmetic operation. An image sensor 121 is constituted with a CCD image sensor or the like. The image sensor 121 captures an image formed with subject light having passed through a photographic lens L and outputs image signals to an A/D conversion circuit 122.

The A/D conversion circuit 122 converts analog image signals to digital signals. The drive of the image sensor 121 and the A/D conversion circuit 122 is controlled with predetermined operation timing based upon a drive signal output from a timing circuit 124.

The image sensor 121 is structured so as to allow the imaging sensitivity (exposure sensitivity) to be adjusted within a predetermined range. The term "imaging sensitivity" is used to refer to the sensitivity with which electrical charges stored at the image sensor 121 are detected or the extent of control by which the amplification gain at an amplifier circuit (not shown) is altered. The imaging sensitivity is indicated by the corresponding ISO sensitivity value. In the embodiment, the imaging sensitivity can be set within a range that includes imaging sensitivity levels equivalent to ISO 100~ISO 1600, imaging sensitivity level "HI-1" higher than the level equivalent to ISO 1600 and an imaging sensitivity level "HI-2" higher than the " HI-1" level.

An ASIC 123 constituting an image signal processing circuit executes a specific type of signal processing on the image signals resulting from the digital conversion in response to an instruction issued by the arithmetic operation circuit 101. The signal processing executed by the ASIC includes image processing such as white balance (WB) adjustment executed to optimize the color temperature of the color image data, compression processing for compressing image data resulting from the image processing into a predetermined format and decompression processing for decompressing data having undergone the compression processing. Image data currently undergoing the signal processing at the ASIC 123 and image data yet to undergo signal processing or having undergone signal processing are temporarily stored into a buffer memory 125. A recording medium 126 is constituted with a detachable flash memory or the like. The image data stored in the buffer memory 125 are recorded into the recording medium 126.

A photo metering device 102 detects the quantity of light having been transmitted through the photographic lens L and outputs a light quantity detection signal to the arithmetic operation circuit 101. The light quantity detection signal indicates the brightness in the photographic field. A shutter control circuit 103 individually controls the hold on and the release of a front curtain and a rear curtain (not shown) at a shutter 104. An aperture position detection device 107 detects the position of an aperture having been driven to a specific aperture position via a sequence device to be detailed later and outputs an aperture position detection signal to the arithmetic operation circuit 101. An aperture engaging device 108 engages the aperture being driven so as to stop the aperture at a position corresponding to a specific aperture value.

A motor control circuit 105 controls the drive of a sequence motor 106 in response to an instruction issued by the arithmetic operation circuit 101. The sequence motor 106, constituting a sequence drive device for controlling the imaging sequence (not shown), raises/lowers a mirror (not shown), drives the aperture (not shown), charges the shutter 104 and the like. A sequence switch SW1 built in to the sequence drive device (not shown) generates brake control timing for the sequence motor 106 and the like.

Figure 2:
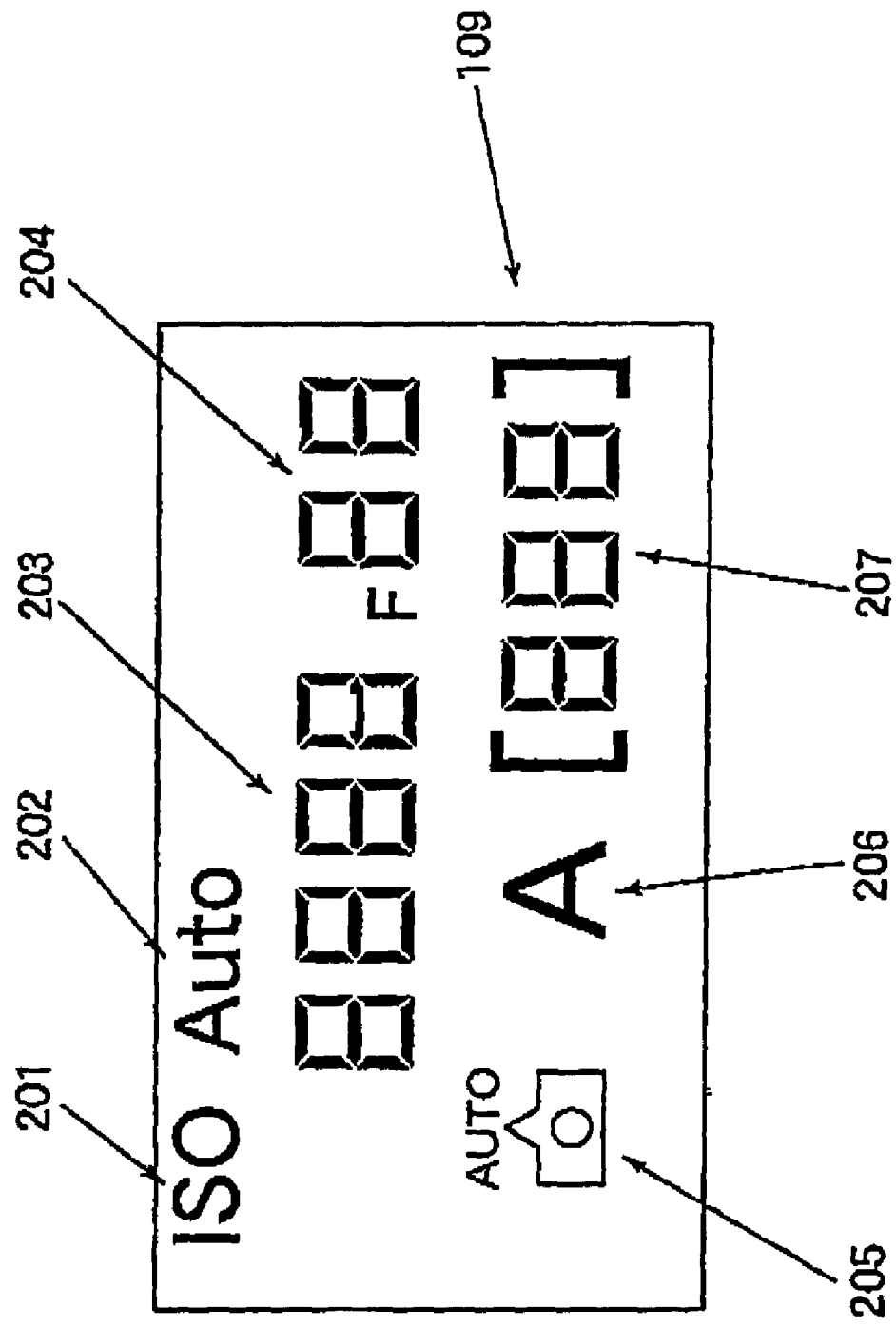
FIG. 2 shows contents of a display brought up at a display device.

At a display device 109, a display indicating the exposure mode, the shutter speed, the aperture value, the number of photographic frames available for photographing, the imaging sensitivity and the like is brought up in response to an instruction issued by the arithmetic operation circuit 101. FIG. 2 shows the contents of the display brought up at the display device 109. "ISO" is displayed at a segment 201 and "Auto" is displayed at a segment 202. At a segment group 203 a row of four display elements each made of seven segments (appears as 8888 in the figure) to display four digits, the imaging sensitivity is indicated when setting the imaging sensitivity but the shutter speed is indicated at other times.

At a segment at which "F" is displayed and a segment group 204 a row of two display elements each made of seven segments (appears as 88 in the figure) to display two digits, the aperture value is indicated. At a segment 205, a display indicating that an "auto mode" is currently selected for the photographing mode is brought up. The "auto mode" is a photographing mode in which the electronic camera automatically selects settings related to exposure (except for the imaging sensitivity).

"A" displayed at a segment 206 indicates that an "A mode" is selected for the photographing mode. The "A mode" is a photographing mode (automatic exposure mode—aperture priority) in which the electronic camera automatically selects the settings related to exposure by using the current aperture value setting. At a segment group 207 a row of three display elements each made of seven segments (appears as 888 in the figure) to display three digits, within the set of "[ ]" a display indicating the number of remaining frames is brought up.

A shutter release switch SW2 enters an ON state by interlocking with depression of a shutter release button (not shown) and enters an OFF state by interlocking with a release of the depressed shutter release button. An ON signal from the shutter release switch SW2 is input to the arithmetic operation circuit 101 where it is used as a photographing start instruction.

Command dial switches SW6 and SW7 are turned ON/OFF by interlocking with a rotating operation at a command dial (not shown). The arithmetic operation circuit 101 detects the extent to which the command dial is rotated based upon the number of times, the signals from the switches SW6 and SW7 are turned ON/OFF and detects the rotating direction based upon the relationship between the phases of the signals from the switches SW6 and SW7.

A photographing mode switch SW3 enters an ON state by interlocking with a depression of a photographing mode button (not shown) and enters an OFF state by interlocking with a release of the depressed photographing mode button. As operation signals from the command dial switches SW6 and SW7 are input while an ON signal from the photographing mode switch SW3 is input to the arithmetic operation circuit 101, the arithmetic operation circuit 101 uses these operation signals as a photographing mode adjustment instruction and changes the photographing mode setting to the "auto mode" or the "A mode".

Figure 3:
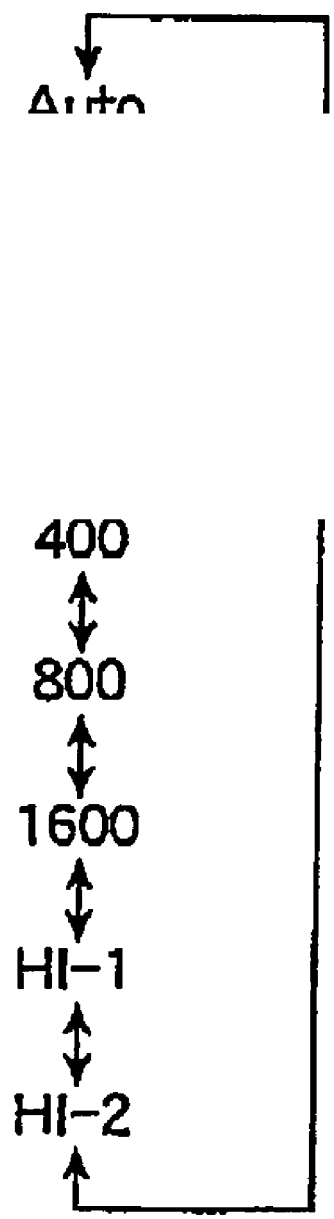
FIGS. 3A and 3B present examples of settings that may be selected in response to imaging sensitivity adjustment instructions, with FIG. 3A showing settings that may be selected when an "Auto" mode is set for the photographing mode and FIG. 3B showing the settings that may be selected when an "A" mode is set for the photographing mode.
Figure 3:
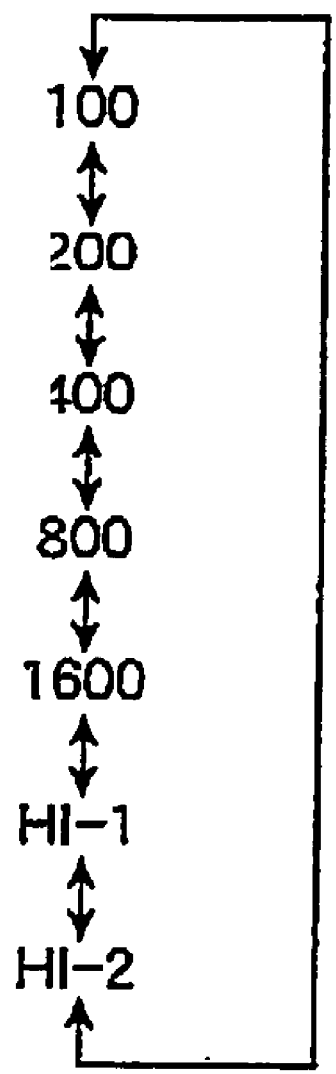

An imaging sensitivity switch SW4 enters an ON state by interlocking with a depression of an imaging sensitivity button (not shown) and enters an OFF state by interlocking with a release of the depressed imaging sensitivity button. As operation signals from the command dial switches SW6 and SW7 are input while an ON signal from the imaging sensitivity switch SW4 is input to the arithmetic operation circuit 101, the arithmetic operation circuit 101 uses these operation signals as an imaging sensitivity adjustment instruction. Each time an imaging sensitivity adjustment instruction is issued in the electronic camera set in the "auto mode", the electronic camera sequentially switches the imaging sensitivity in the order of, for instance, "Auto"-"ISO 100"-"ISO 200"-"ISO 400"-"ISO 800"-"ISO 1600"-"HI-1"-"HI-2"-"Auto" . . . as shown in FIG. 3A. "Auto" indicates that "imaging sensitivity auto setting" is on, and when the "imaging sensitivity auto setting" is on, the electronic camera automatically determines the imaging sensitivity regardless of the current imaging sensitivity setting.

In addition, each time an imaging sensitivity adjustment instruction is issued in the electronic camera set in the "A mode", the electronic camera sequentially switches the imaging sensitivity in the order of, for instance, "ISO 100"-"ISO 200"-"ISO 400"-"ISO 800"-"ISO 1600"-"HI-1"-"HI-2"-"ISO 100" . . . as shown in FIG. 3B. The "Auto" setting is not selected in the "A mode" since the "imaging sensitivity auto setting" cannot be turned on in the A mode.

A sensitivity auto control switch SW5 enters an ON state by interlocking with a depression of a sensitivity auto control mode button (not shown) and enters an OFF state by interlocking with a release of the depressed sensitivity auto control mode button. As operation signals from the command dial switches SW6 and SW7 are input while an ON signal from the imaging sensitivity auto control mode switch SW5 is input to the arithmetic operation circuit 101, the arithmetic operation circuit 101 uses these operation signals as instructions for setting/clearing the "sensitivity auto control mode" and for setting the upper limit for the imaging sensitivity adjustment.

The term "sensitivity auto control" is used to refer to control under which exposure calculation is executed based upon the current imaging sensitivity setting selected at the electronic camera and the subject luminance having been calculated and if optimal exposure cannot be achieved through the initial exposure calculation, exposure calculation is executed again by automatically adjusting the imaging sensitivity. It is to be noted that the "sensitivity auto control mode" can be set or cleared only when the "A mode" is set as the photographing mode. When the "auto mode" is set as the photographing mode, control in the "sensitivity auto control mode" is disallowed.

The arithmetic operation circuit 101 uses operation signals input thereto from the command dial switches SW6 and SW7 as an aperture value adjustment instruction while no operation signal is input from the photographing mode switch SW3, the imaging sensitivity switch SW4 or the sensitivity auto control mode switch SW5. In this case, the electronic camera adjusts the aperture setting within a range of F 2.8 to F 22 in accordance with a predetermined procedure in response to the aperture value adjustment instruction.

(Main Processing)

Figure 4:
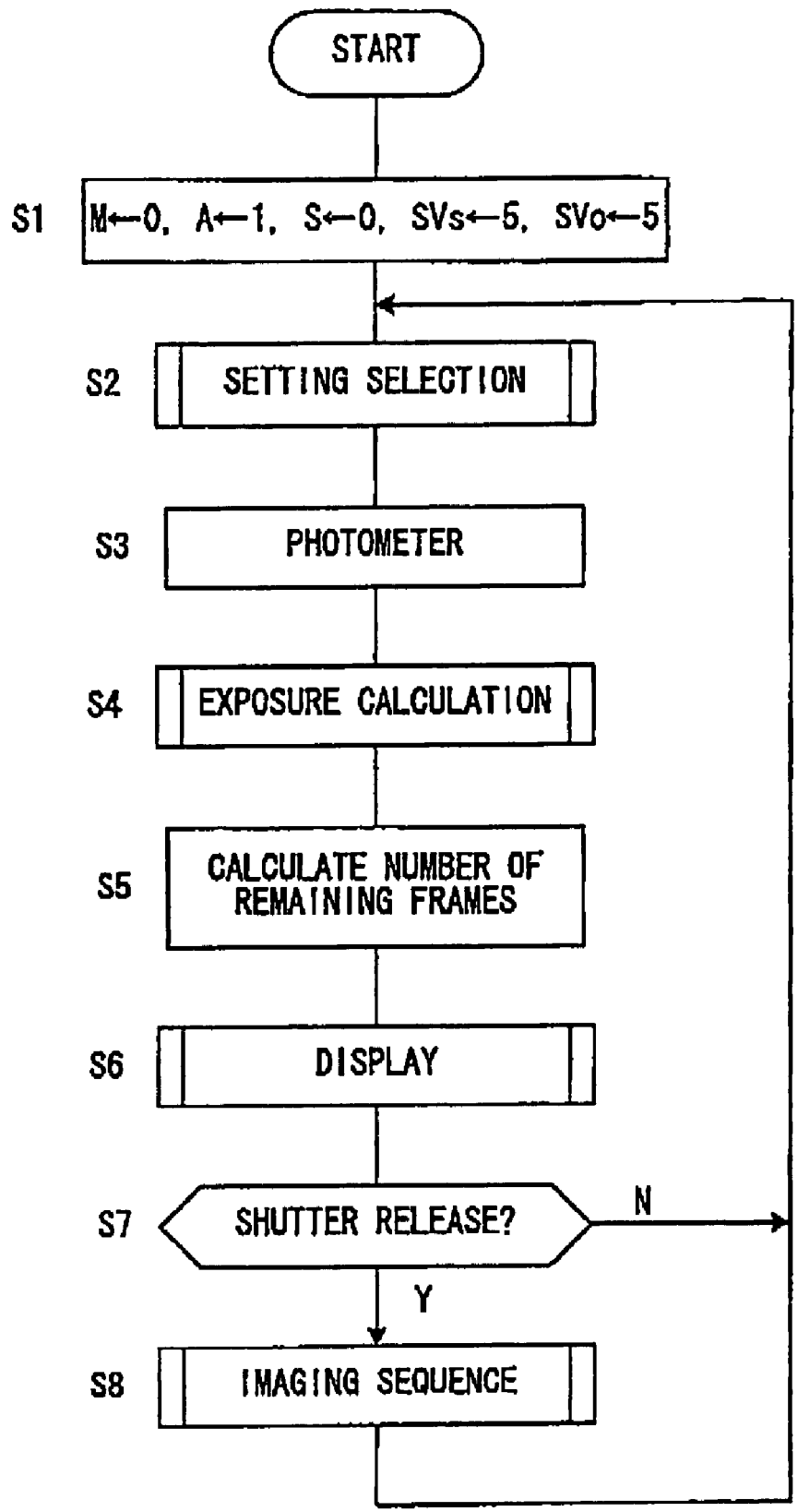
FIG. 4 presents a flowchart of the main processing executed in an arithmetic operation circuit.

The camera operation processing executed at the arithmetic operation circuit 101 of the electronic camera is now explained in reference to the flowchart presented in FIG. 4. The program that enables the processing shown in the flowchart in FIG. 4 is started up as a battery (not shown) is loaded into the electronic camera.

In step S1 in FIG. 4, the arithmetic operation circuit 101 selects initial settings as detailed below. Namely, it sets a photographing mode flag M to 0, a sensitivity auto setting mode flag A to 1, a sensitivity auto control mode flag S to 0, an imaging sensitivity setting SVs to 5 (ISO 100) and a sensitivity storage parameter SVo to 5, and then the operation proceeds to step S2. It is to be noted that an apex value is selected for SVs.

The photographing mode flag M is set to 0 when the "auto mode" is selected for the photographing mode and is set to 1 when the "A mode" is selected for the photographing mode. The sensitivity auto setting mode flag A is set to 1 when the "imaging sensitivity auto setting" is turned on and is set to 0 when the "imaging sensitivity auto setting" is turned off. The sensitivity auto control mode flag S is set to 1 when the "sensitivity auto control mode" is selected and is set to 0 when the "sensitivity auto control mode" is cleared. The sensitivity storage parameter SVo is a parameter used to store details of the adjusted setting selected in response to an imaging sensitivity adjustment instruction.

In step S2, the arithmetic operation circuit 101 executes settings processing and then the operation proceeds to step S3. The settings processing is to be described in detail later. In step S3, the arithmetic operation circuit 101 determines through arithmetic operation the quantity (BV-$AV_0$) of light having been transmitted through the lens based upon the detection signal input from the photometering device 102 and executes a photometering operation for determining the subject luminance BV by using the light quantity value having been determined through the arithmetic operation. Then the operation proceeds to step S4. The subject luminance BV can be calculated by adding an open aperture value $AV_0$ to the quantity (BV-$AV_0$) of the light having been transmitted through that lens. It is to be noted that $AV_0$=3, i.e., F2.8, in the embodiment. It is also to be noted that BV and $AV_0$ (3 in the example explained above) each assumes an apex value.

In step S4, the arithmetic operation circuit 101 executes exposure calculation processing before the operation proceeds to step S5. The exposure calculation processing is to be described in detail later. In step S5, the arithmetic operation circuit 101 calculates the number of remaining frames indicating the number of images that can still be recorded into the recording medium 126, and then the operation proceeds to step S6. In step S6, the arithmetic operation circuit 101 executes display processing for the display device 109 before the operation proceeds to step S7. The display processing is to be described in detail later.

In step S7, the arithmetic operation circuit 101 makes a decision as to whether or not a shutter release operation has been performed. The arithmetic operation circuit 101 makes an affirmative decision in step S7 if an ON signal has been input from the shutter release switch SW2 and in this case, the operation proceeds to step S8. If, on the other hand, an ON signal has not been input from the shutter release switch SW2, the arithmetic operation circuit 101 makes a negative decision in step S7, and the operation returns to step S2.

In step S8, the arithmetic operation circuit 101 executes imaging sequence processing, and then the operation returns to step S2. The imaging sequence processing is to be described in detail later. The sequence of photographing processing thus ends.

(Settings Processing)

Figure 5:
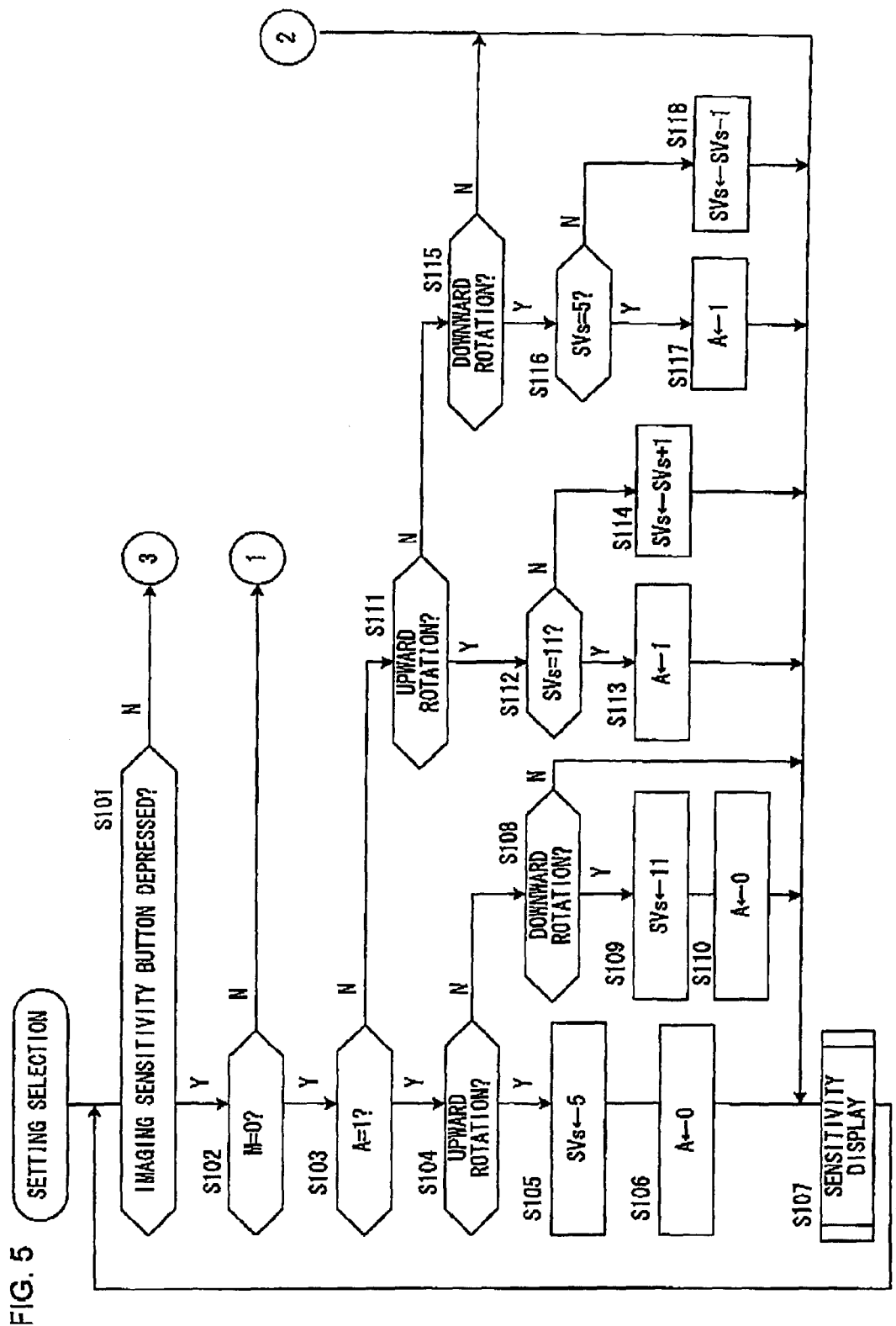
FIG. 5 presents a flowchart of the settings processing executed in the arithmetic operation circuit.

The settings processing executed in step S2 is now explained in detail in reference to the flowchart presented in FIGS. 5 through B. In step S101 in FIG. 5, the arithmetic operation circuit 101 makes a decision as to whether or not the imaging sensitivity button is currently depressed. The arithmetic operation circuit 101 makes an affirmative decision in step S101 if an ON signal has been input from the imaging sensitivity switch SW4 and, in this case, the operation proceeds to step S102. If, on the other hand, an ON signal has not been input from the imaging sensitivity switch SW4, it makes a negative decision in step S101 and, in this case, the operation proceeds to step S141 in FIG. 7.

In step S102, the arithmetic operation circuit 101 makes a decision as to whether or not the photographing mode flag M is currently set to 0. If M=0 (auto mode), the arithmetic operation circuit 101 makes an affirmative decision in step S102 to proceed to step S103, whereas if M≠0 (i.e., if the A mode is currently selected in this example), it makes a negative decision in step S102 to proceed to step S123 in FIG. 6.

In step S103, the arithmetic operation circuit 101 makes a decision as to whether or not the sensitivity auto setting mode flag A is currently set to 1. If A=1 (if the imaging sensitivity auto setting is ON), the arithmetic operation circuit 101 makes an affirmative decision in step S103 to proceed to step S104, whereas if A≠1 (i.e., if the imaging sensitivity auto setting is OFF), it makes a negative decision in step S103 to proceed to step S111.

In step S104, the arithmetic operation circuit 101 makes a decision as to whether or not the command dial is being rotated upward. If operation signals indicating a counterclockwise rotation have been input from the command dial switches SW6 and SW7, the arithmetic operation circuit 101 makes an affirmative decision in step S104 to proceed to step S105, whereas if operation signals indicating a counterclockwise rotation have not been input, it makes a negative decision in step S104 to proceed to step S108.

In step S105, the arithmetic operation circuit 101 sets 5 (ISO 100) for the imaging sensitivity setting SVs, and then the operation proceeds to step S106. In step S106, the arithmetic operation circuit 101 sets the sensitivity auto setting mode flag A to 0 before the operation proceeds to step S107. As described above, the ON status of the "imaging sensitivity auto setting" is canceled in response to an upward rotation of the command dial so as to allow imaging sensitivity to be adjusted, starting at "ISO 100" in the embodiment.

In step S107, the arithmetic operation circuit 101 executes sensitivity display processing, before the operation returns to step S101. The sensitivity display processing is to be described in detail later.

In step S108, to which the operation proceeds after making a negative decision in step S104 as described above, the arithmetic operation circuit 101 makes a decision as to whether or not the command dial is being rotated downward. If operation signals indicating a clockwise rotation have been input from the command dial switches SW6 and SW7, the arithmetic operation circuit 101 makes an affirmative decision in step S108 to proceed to step S109, whereas if operation signals indicating a clockwise rotation have not been input, it makes a negative decision in step S108 to proceed to step S107.

In step S109, the arithmetic operation circuit 101 sets 11 (HI-2 explained earlier) for the imaging sensitivity setting SVs, and then the operation proceeds to step S110 In step S110, the arithmetic operation circuit 101 sets the sensitivity auto setting mode flag A to 0 before the operation proceeds to step S107. As described above, the ON status of the "imaging sensitivity auto setting" is canceled in response to a downward rotation of the command dial so as to allow the imaging sensitivity to be adjusted, starting at "HI-2" in the embodiment.

In step S111, to which the operation proceeds after making a negative decision in step S103 as described above, the arithmetic operation circuit 101 makes a decision as to whether or not the command dial is being rotated upward. If operation signals indicating a counterclockwise rotation have been input from the command dial switches SW6 and SW7, the arithmetic operation circuit 101 makes an affirmative decision in step S111 to proceed to step S112, whereas if operation signals indicating a counterclockwise rotation have not been input, it makes a negative decision in step S111 to proceed to step S115.

In step S112, the arithmetic operation circuit 101 makes a decision as to whether or not SVs is currently set to 11. If SVs=11 (HI-2), the arithmetic operation circuit 101 makes an affirmative decision in step S112 to proceed to step S113, whereas if SVs≠11, it makes a negative decision in step S112 to proceed to step S114. In step S113, the arithmetic operation circuit 101 sets the sensitivity auto setting mode flag A to 1 and then the operation proceeds to step S107. As described above, the "imaging sensitivity auto setting" enters an ON state as the command dial is rotated upward while the current imaging sensitivity setting is "HI-2" in the embodiment, In step S114, the arithmetic operation circuit 101 increments the value set for the imaging sensitivity setting SVs by 1, and then the operation proceeds to step S107. As a result, the imaging sensitivity setting SVs is adjusted to a level higher by one step.

In step S115, to which the operation proceeds after making a negative decision in step S111 as described above, the arithmetic operation circuit 101 makes a decision as to whether or not the command dial is being rotated downward. If operation signals indicating a clockwise rotation have been input from the command dial switches SW6 and SW7, the arithmetic operation circuit 101 makes an affirmative decision in step S115 to proceed to step S116, whereas if operation signals indicating a clockwise rotation have not been input, it makes a negative decision in step S115 to proceed to step S107.

In step S116, the arithmetic operation circuit 101 makes a decision as to whether or not SVs is currently set to 5. If SVs=5 (ISO 100), the arithmetic operation circuit 101 makes an affirmative decision in step S116 to proceed to step S117, whereas if SVs≠5, it makes a negative decision in step S116 to proceed to step S118. In step S117, the arithmetic operation circuit 101 sets the sensitivity auto setting mode flag A to 1 and then the operation proceeds to step S107. As described above, the "imaging sensitivity auto setting" enters an ON state as the command dial is rotated downward while the current imaging sensitivity setting is "ISO 100" in the embodiment.

In step S118, the arithmetic operation circuit 101 decrements the value set for the imaging sensitivity setting SVs by 1, and then the operation proceeds to step S107. As a result, the imaging sensitivity setting SVs is adjusted to a level lower by one step.

Figure 6:
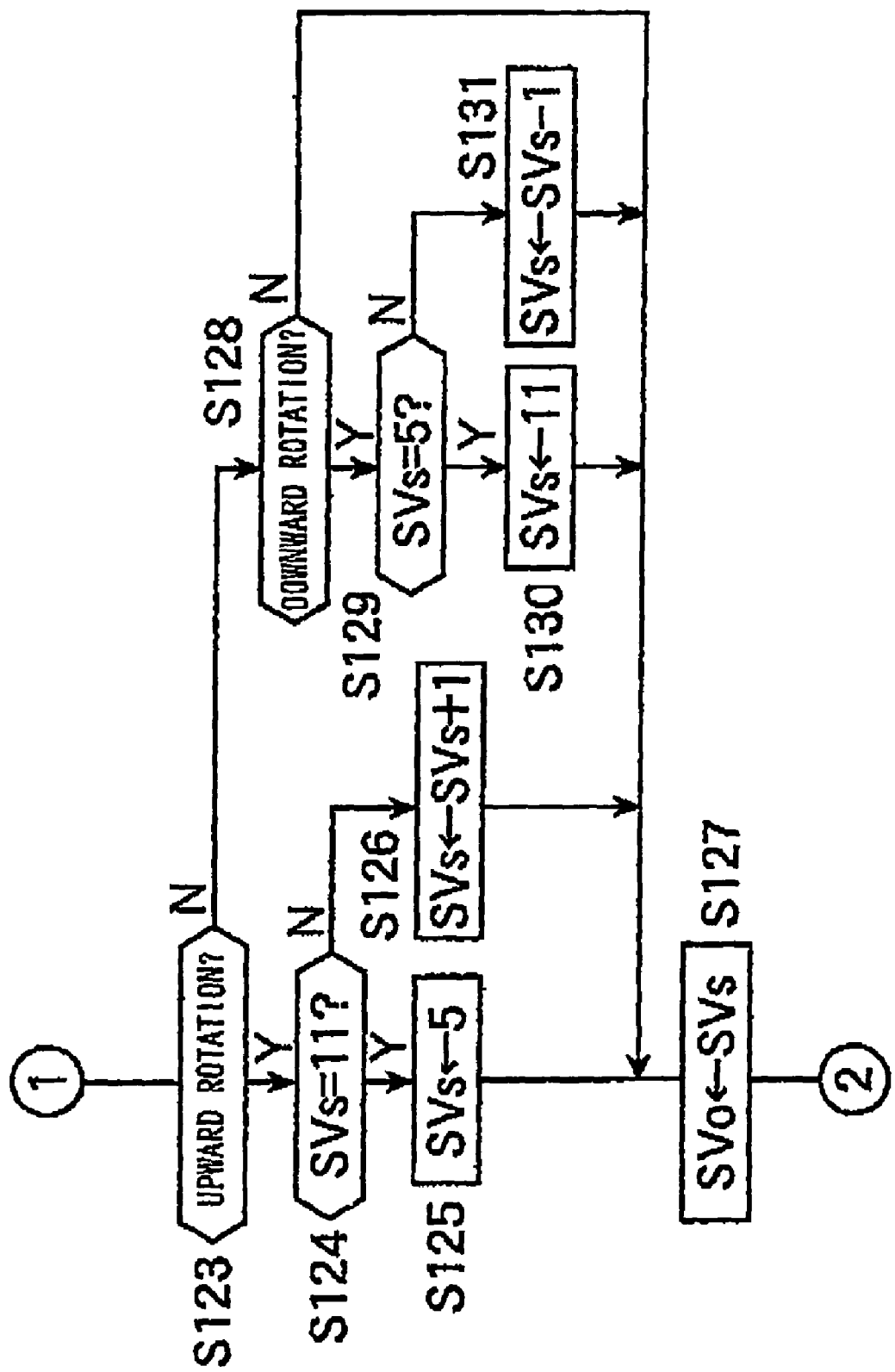
FIG. 6 presents a flowchart of the settings processing executed in the arithmetic operation circuit.

In step S123 in FIG. 6, to which the operation proceeds after making a negative decision in step S102 as described above, the arithmetic operation circuit 101 makes a decision as to whether or not the command dial is being rotated upward. If operation signals indicating a counterclockwise rotation have been input from the command dial switches SW6 and SW7, the arithmetic operation circuit 101 makes an affirmative decision in step S123 to proceed to step S124, whereas if operation signals indicating a counterclockwise rotation have not been input, it makes a negative decision in step S123 to proceed to step S128.

In step S124, the arithmetic operation circuit 101 makes a decision as to whether or not SVs is currently set to 11. If SVs=11 (HI-2), the arithmetic operation circuit 101 makes an affirmative decision in step S124 to proceed to step S125, whereas if SVs≠11, it makes a negative decision in step S124 to proceed to step S126. In step S125, the arithmetic operation circuit 101 sets 5 (ISO 100) for the imaging sensitivity setting SVs and then the operation proceeds to step S127.

In step S127, the arithmetic operation circuit 101 increments the value set for the imaging sensitivity setting SVs by 1, and then the operation proceeds to step S127. As a result, the imaging sensitivity setting SVs is adjusted to a level higher by one step.

In step S128, to which the operation proceeds after making a negative decision in step S123 as described above, the arithmetic operation circuit 101 makes a decision as to whether or not the command dial is being rotated downward. If operation signals indicating a clockwise rotation have been input from the command dial switches SW6 and SW7, the arithmetic operation circuit 101 makes an affirmative decision in step S128 to proceed to step S129, whereas if operation signals indicating a clockwise rotation have not been input, it makes a negative decision in step S12B to proceed to step S127.

In step S129, the arithmetic operation circuit 101 makes a decision as to whether or not the current imaging sensitivity setting SVs is 5. If SVs=5 (ISO 100), the arithmetic operation circuit 101 makes an affirmative decision in step S129 to proceed to step S130, whereas if SVs≠5, it makes a negative decision in step S129 to proceed to step S131.

In step S130, the arithmetic operation circuit 101 sets 11 (HI-2) for the imaging sensitivity setting SVs and then the operation proceeds to step S127. In step S131, the arithmetic operation circuit 101 decrements the value set for the imaging sensitivity setting SVs by 1, and then the operation proceeds to step S127. As a result, the imaging sensitivity setting SVs is adjusted to a level lower by one step.

In step S127, the arithmetic operation circuit 101 sets the value having been selected as the imaging sensitivity setting SVs for the sensitivity storage parameter SVo, and then the operation proceeds to step S107 in FIG. 5. As a result, the imaging sensitivity SVs having been selected in the "A mode" is stored as the sensitivity storage parameter SVo.

Figure 7:
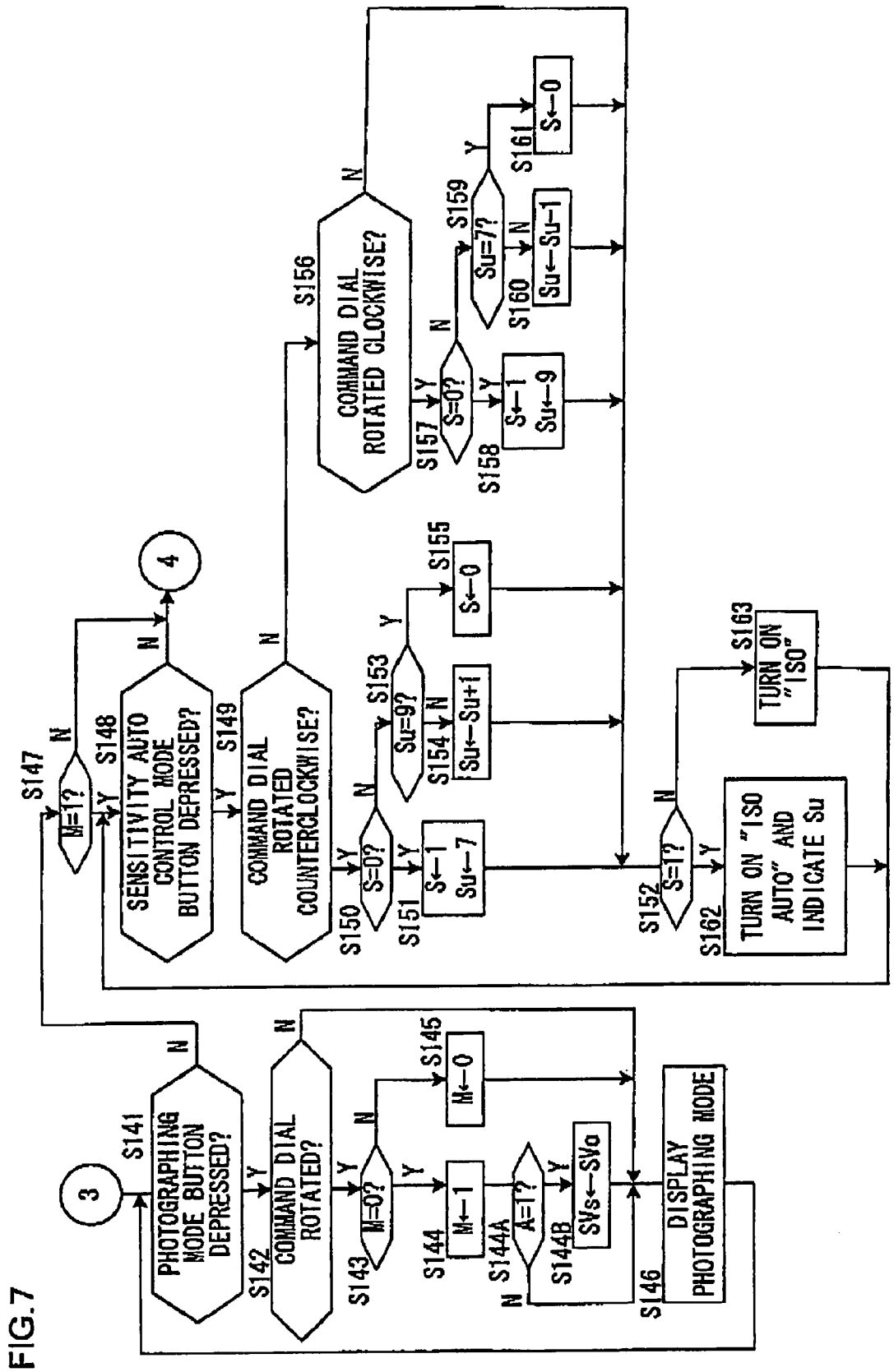
FIG. 7 presents a flowchart of the settings processing executed in the arithmetic operation circuit.

In step S141 in FIG. 7, to which the operation proceeds after making a negative decision in step S101 as described above, the arithmetic operation circuit 101 makes a decision as to whether or not the photographing mode button has been depressed. The arithmetic operation circuit 101 makes an affirmative decision in step S141 if an operation signal has been input from the photographing mode switch SW3 to proceed to step 3142, whereas it makes a negative decision in step S141 if no operation signal has been input from the photographing mode switch SW3 and, in this case, the operation proceeds to step S147.

Instep S142, the arithmetic operation circuit 101 makes a decision as to whether or not the command dial has been rotated. The arithmetic operation circuit 101 makes an affirmative decision in step S142 if operation signals have been input from the command dial switches SW6 and SW7 to proceed to step S143, whereas it makes a negative decision in step S142 if no operation signals have been input to proceed to step S146.

In step S143, the arithmetic operation circuit 101 makes a decision as to whether or not the photographing mode flag M is currently set to 0. If M=0 (auto mode), the arithmetic operation circuit 101 makes an affirmative decision in step S143 to proceed to step S144, whereas if M≠0 (i.e., if the A mode is currently selected in this example), it makes a negative decision in step S143 to proceed to step S145.

In step S144, the arithmetic operation circuit 101 sets the photographing mode flag M to 1, i.e., sets the "A mode" for the photographing mode, and then the operation proceeds to step S144A. In step S145, the arithmetic operation circuit 101 sets the photographing mode flag M to 0, i.e., sets the "auto mode" for the photographing mode, and then the operation proceeds to step S146. In step S144A, the arithmetic operation circuit 101 makes a decision as to whether or not the sensitivity auto setting mode flag A is currently set to 1 if A=1 (if the imaging sensitivity auto setting is ON), the arithmetic operation circuit 101 makes an affirmative decision in step S144A to proceed to step S144A, whereas if A≠1 (i.e., if the imaging sensitivity auto setting is OFF), it makes a negative decision in step S144A to proceed to step S146.

In step S144B, the arithmetic operation circuit 101 sets the value stored as the sensitivity storage parameter SVo as the imaging sensitivity setting SVs before the operation proceeds to step S146. Thus, as the photographing mode is switched from the "auto mode" to the "A mode" while the "imaging sensitivity auto setting" is on, the sensitivity value having been selected for the most recent "A mode" operation is set as SVs. In step S146, the arithmetic operation circuit 101 issues an instruction for the display device 109 to bring up a display indicating the photographing mode, and then the operation returns to step S141.

Figure 16B:
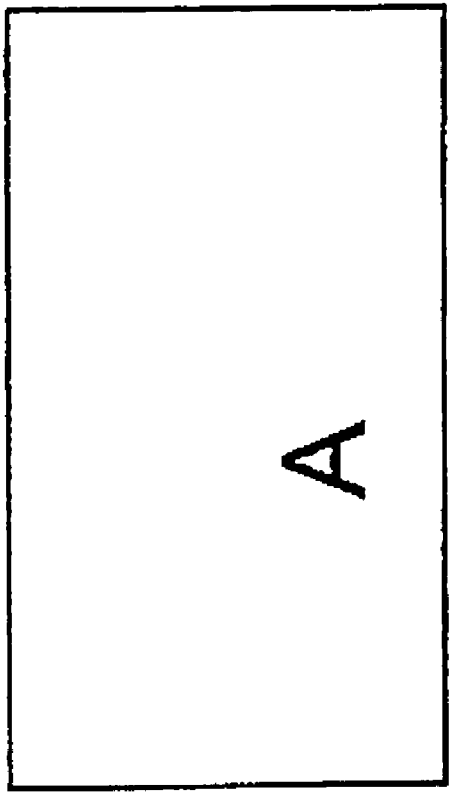
FIGS. 16A and 16B present display examples that may be brought up at the display device.
Figure 16A:
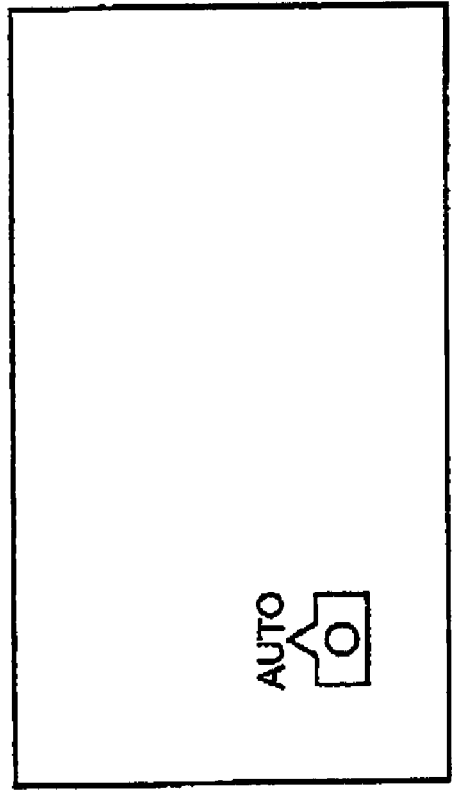

FIGS. 16A and 16B present examples of displays that may be provided via the display device 109. The display in FIG. 16A, which is brought up while the photographing mode button is depressed, indicates that the "auto mode" has been selected for the photographing mode, with the segment 205 indicating the "auto mode" in an ON state. FIG. 16B, which is also brought up while the photographing mode button is depressed, indicates that the "A mode" has been selected for the photographing mode with the segment 206 indicating the "A mode" in an ON state.

In step S147, to which the operation proceeds after making a negative decision in step S141 in FIG. 7 as described above, the arithmetic operation circuit 101 makes a decision as to whether or not the photographing mode flag M is currently set to 1. If M=1 (A mode), the arithmetic operation circuit 101 makes an affirmative decision in step S147 to proceed to step S148, whereas if M≠1 (i.e., if the auto mode is currently selected in this example), it makes a negative decision in step S147 to proceed to step S171 in FIG. 8.

Instep S148, the arithmetic operation circuit 101 makes a decision as to whether or not the sensitivity auto control mode button has been depressed. The arithmetic operation circuit 101 makes an affirmative decision in step S148 if an operation signal has been input from the sensitivity auto control mode switch SW5 to proceed to step S149, whereas it makes a negative decision in step S148 if no operation signal has been input from the sensitivity auto control mode switch SW5 to proceed to step S171 in FIG. 8.

Instep S149, the arithmetic operation circuit 101 makes a decision as to whether or not the command dial has been rotated along the counterclockwise direction. The arithmetic operation circuit 101 makes an affirmative decision in step S149 if operation signals indicating a counterclockwise rotation have been input from the command dial switches SW6 and SW7 to proceed to step S150, whereas it makes a negative decision in step S149 if no operation signals indicating a counterclockwise rotation have been input and, in this case, the operation proceeds to step S156.

Instep S150, the arithmetic operation circuit 101 makes a decision as to whether or not the sensitivity auto control mode flag S is currently set to 0. If S=0 (if the sensitivity auto control mode has been cleared), the arithmetic operation circuit 101 makes an affirmative decision in step S150 to proceed to step S151, whereas if S≠0 (i.e., if the sensitivity auto control mode is currently selected in this case) it makes a negative decision in step S150 to proceed to step S153.

In step S151, the arithmetic operation circuit 101 sets the sensitivity auto control mode flag S to 1, i.e., selects the "sensitivity auto control mode", and also sets 7 (ISO 400) as the sensitivity adjustment upper limit Su, before the operation proceeds to step S152. In step S153, the arithmetic operation circuit 101 makes a decision as to whether or not the sensitivity adjustment upper limit Su is equal to 9. If Su=9 (ISO 1600), the arithmetic operation circuit 101 makes an affirmative decision in step S153 to proceed to step S155, whereas if Su≠9, it makes a negative decision in step S153 to proceed to step S154.

In step S154, the arithmetic operation circuit 101 increments the value set for the sensitivity adjustment upper limit Su by one, and then the operation proceeds to step S152. As a result, the imaging sensitivity adjustment upper limit Su is raised by one step. In step S155, the arithmetic operation circuit 101 sets the sensitivity auto control mode flag S to 0, i.e., clears the "sensitivity auto control mode", before the operation proceeds to step S152.

In step S156, to which the operation proceeds after making a negative decision in step S149 as described above, the arithmetic operation circuit 101 makes a decision as to whether or not the command dial has been rotated along the clockwise direction. The arithmetic operation circuit 101 makes an affirmative decision in step S156 if operation signals indicating a clockwise rotation have been input from the command dial switches SW6 and SW7 to proceed to step S157, whereas it makes a negative decision in step S156 if no operation signals indicating a clockwise rotation have been input and, in this case, the operation proceeds to step S152.

In step S157, the arithmetic operation circuit 101 makes a decision as to whether or not the sensitivity auto control mode flag S is currently set to 0. If S=0 (if the sensitivity auto control mode has been cleared), the arithmetic operation circuit 101 makes an affirmative decision in step S157 to proceed to step S158, whereas if S≠0 (i.e., if the sensitivity auto control mode is currently selected in this case) it makes a negative decision in step S157 to proceed to step S159.

In step S158, the arithmetic operation circuit 101 sets the sensitivity auto control mode flag S to 1, i.e., selects the "sensitivity auto control mode", and also sets 9 (ISO 1600) as the sensitivity adjustment upper limit Su, before the operation proceeds to step S152. In step S159, the arithmetic operation circuit 101 makes a decision as to whether or not the sensitivity adjustment upper limit Su is equal to 7. If Su=7 (ISO 400), the arithmetic operation circuit 101 makes an affirmative decision in step S159 to proceed to step S161, whereas if Su≠7, it makes a negative decision in step S159 to proceed to step S160.

In step S160, the arithmetic operation circuit 101 decrements the value set for the sensitivity adjustment upper limit Su by one, and then the operation proceeds to step S152. As a result, the imaging sensitivity adjustment upper limit Su is lowered by one step In step S161, the arithmetic operation circuit 101 sets the sensitivity auto control mode flag S to 0, i.e., clears the "sensitivity auto control mode", before the operation proceeds to step S152.

In step S152, the arithmetic operation circuit 161 makes a decision as to whether or not the sensitivity auto control mode flags is currently set to 1. If S=1 (if the sensitivity auto control mode is currently selected), the arithmetic operation circuit 101 makes an affirmative decision in step S152 to proceed to step S162, whereas if S=0 (i.e., if the sensitivity auto control mode has been cleared) makes a negative decision in step S152 to proceed to step S163. In step S162, the arithmetic operation circuit 101 transmits an instruction for the display device 109 to turn on "ISO" and "Auto" respectively at the segment 201 and the segment 202, and then the operation returns to step S148. In step S163, the arithmetic operation circuit 101 transmits an instruction for the display device 109 to turn on "ISO" at the segment 201, before the operation returns to step S148.

Figure 17B:
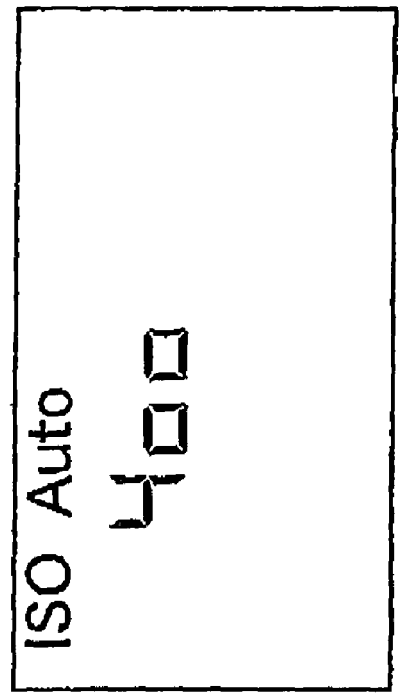
FIGS. 17A~17D present display examples that may be brought up at the display device.
Figure 17D:
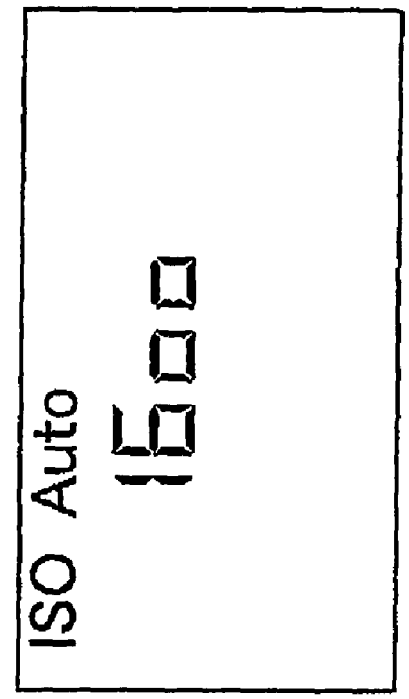
Figure 17A:
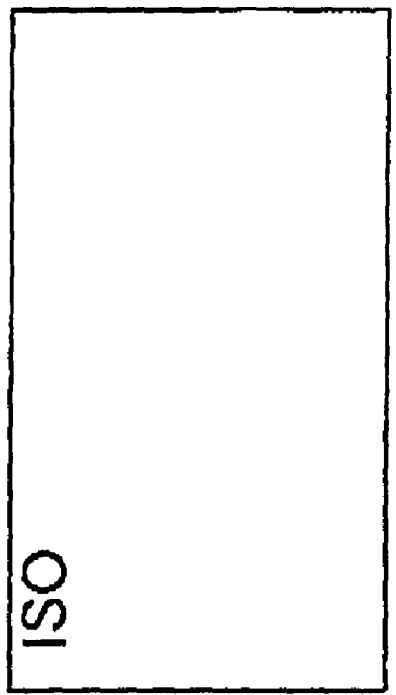
Figure 17C:
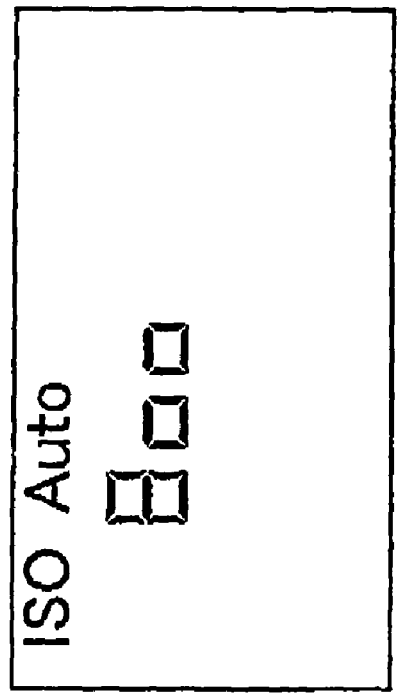

FIGS. 17A~17D presents examples of displays that may be brought up at the display device 109. FIG. 17A shows an example of a display brought up while the sensitivity auto control mode button is depressed, to indicate that the "A mode" is selected for the photographing mode and that the "sensitivity auto control mode" has been cleared, with the segment 201 alone in an ON state. FIGS. 17B through 17D each show an example of a display brought up while the sensitivity auto control mode button is depressed, to indicate that the "A mode" has been selected for the photographing mode and that the "sensitivity auto control mode" has also been set. FIGS. 17B~17D each show that the segment 201 and the segment 202 are in an ON state with the value indicating the imaging sensitivity adjustment upper limit Su displayed at the segment group 203. "Auto" at the segment 202 indicates that the "sensitivity auto control mode" has been selected.

Figure 8:
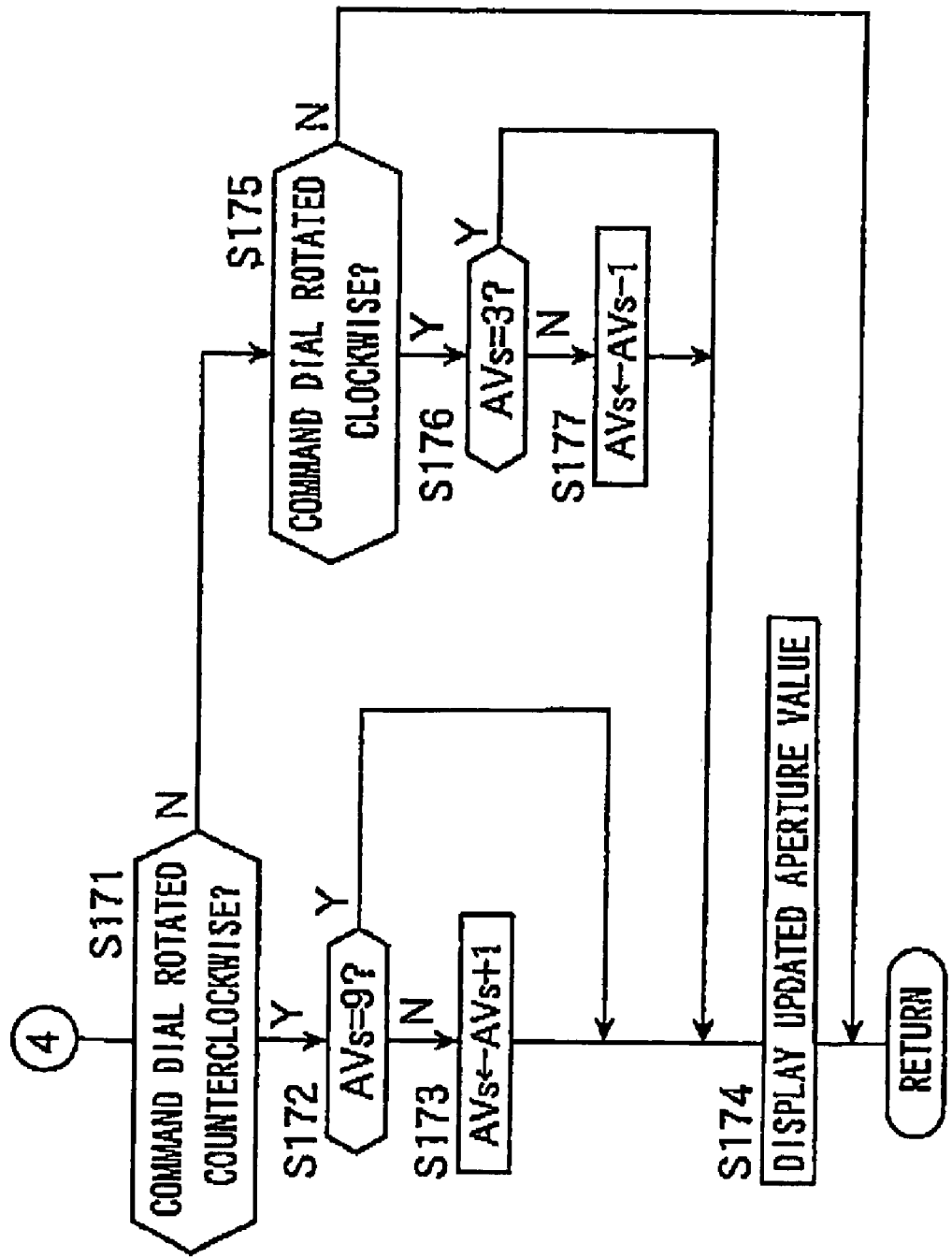
FIG. 8 presents a flowchart of the settings processing executed in the arithmetic operation circuit.

In step S171 in FIG. 8, to which the operation proceeds after making a negative decision in step S147 or step S148 as described above, the arithmetic operation circuit 101 makes a decision as to whether or not the command dial has been rotated along the counterclockwise direction. The arithmetic operation circuit 101 makes an affirmative decision in step S171 if operation signals indicating a counterclockwise rotation have been input from the command dial switches SW6 and SW7 to proceed to step S172, whereas it makes a negative decision in step S171 if no operation signals indicating a counterclockwise rotation have been input and, in this case, the operation proceeds to step S175.

In step S172, the arithmetic operation circuit 101 makes a decision as to whether or not 9 (F 22) has been selected for the aperture setting AVs. If AVs=9, the arithmetic operation circuit 101 makes an affirmative decision in step S172 to proceed to step S174, whereas if AVs≠9, it makes a negative decision in step S172 to proceed to step S173. In step S173, the arithmetic operation circuit 101 increments the value set for the aperture setting AVs by one, and then the operation proceeds to step S174. As a result, the aperture value setting is adjusted to a level higher by one step.

In step S175, to which the operation proceeds after making a negative decision in step S171 as described above, the arithmetic operation circuit 101 makes a decision as to whether or not the command dial has been rotated along the clockwise direction. The arithmetic operation circuit 101 makes an affirmative decision in step S175 if operation signals indicating a clockwise rotation have been input from the command dial switches SW6 and SW7 to proceed to step S176, whereas it makes a negative decision in step S175 if no operation signals indicating a clockwise rotation have been input, and in this case, the processing in FIGS. 5 through 8 ends.

In step S176, the arithmetic operation circuit 101 makes a decision as to whether or not 3 (F 2.8) has been selected for the aperture setting AVs. If AVs=3, the arithmetic operation circuit 101 makes an affirmative decision in step S176 to proceed to step S174, whereas if AVs≠3, it makes a negative decision in step S176 to proceed to step S177. In step S177, the arithmetic operation circuit 101 decrements the value set for the aperture setting AVs by one, and then the operation proceeds to step S174. As a result, the aperture value setting is adjusted to a level lower by one step.

In step S174, the arithmetic operation circuit 101 transmits an instruction for the display device 109 to update the aperture value display at the segment group 204, and then, the processing in FIGS. 5 through 8 ends.

(Sensitivity Display Processing)

Figure 9:
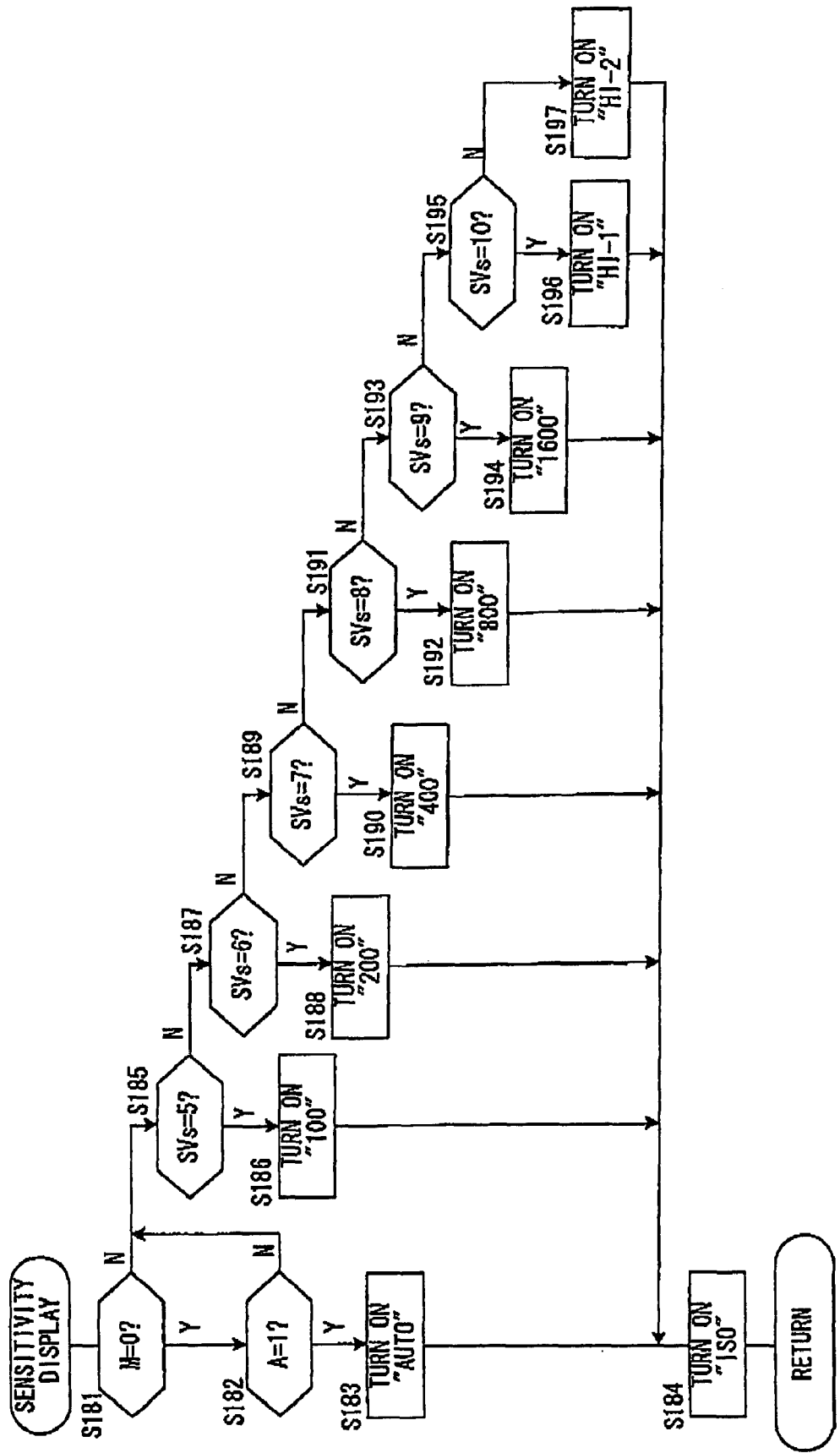
FIG. 9 presents a flowchart of the sensitivity display processing executed in the arithmetic operation circuit.

The sensitivity display processing executed in step S107 in FIG. 5 is now described in detail in reference to the flowchart presented in FIG. 9. In step S181 in FIG. 9, the arithmetic operation circuit 101 makes a decision as to whether or not the photographing mode flag M is currently set to 0. If M=0 (auto mode), the arithmetic operation circuit 101 makes an affirmative decision in step S181 to proceed to step S182, whereas if M≠0 (i.e., if the A mode is currently selected in this example), it makes a negative decision in step S181 to proceed to step S185.

In step S182, the arithmetic operation circuit 101 makes a decision as to whether or not the sensitivity auto setting mode flag A is currently set to 1. If A=1 (if the imaging sensitivity auto setting is ON), the arithmetic operation circuit 101 makes an affirmative decision in step S182 to proceed to step S183, whereas if A≠1 (i.e., if the imaging sensitivity auto setting is OFF), it makes a negative decision in step S182 to proceed to step S185.

In step S183, the arithmetic operation circuit 101 transmits an instruction for the display device 109 to turn on "Auto" at the segment 203, before the operation proceeds to step S184. In step S185, the arithmetic operation circuit 101 makes a decision as to whether or not SVs is currently set to 5 (ISO 100). If SVs=5, the arithmetic operation circuit 101 makes an affirmative decision in step S185 to proceed to step S186, whereas if SVs≠5, it makes a negative decision in step S185 to proceed to step S187. In step S186, the arithmetic operation circuit 101 transmits an instruction for the display device 109 to turn on "100" at the segment group 203 and then the operation proceeds to step S184.

Instep S187, the arithmetic operation circuit 101 makes a decision as to whether or not SVs is currently set to 6 (ISO 200). If SVs=6, the arithmetic operation circuit 101 makes an affirmative decision in step S187 to proceed to step S188, whereas if SVs≠6, it makes a negative decision in step S187 to proceed to step S189. In step S188, the arithmetic operation circuit 101 transmits an instruction for the display device 109 to turn on "200" at the segment group 203 and then the operation proceeds to step S184.

Instep S189, the arithmetic operation circuit 101 makes a decision as to whether or not SVs is currently set to 7 (ISO 400). If SVs=7, the arithmetic operation circuit 101 makes an affirmative decision in step S189 to proceed to step S190, whereas if SVs≠7, it makes a negative decision in step S189 to proceed to step S191. In step S190, the arithmetic operation circuit 101 transmits an instruction for the display device 109 to turn on "400" at the segment group 203 and then the operation proceeds to step S184.

In step S191, the arithmetic operation circuit 101 makes a decision as to whether or not SVs is currently set to 8 (ISO 800). If SVs=8, the arithmetic operation circuit 101 makes an affirmative decision in step S191 to proceed to step S192, whereas if SVs≠8, it makes a negative decision in step S191 to proceed to step S193. In step S192, the arithmetic operation circuit 101 transmits an instruction for the display device 109 to turn on "800" at the segment group 203 and then the operation proceeds to step S184.

In step S193, the arithmetic operation circuit 101 makes a decision as to whether or not SVs is currently set to 9 (ISO 1600). If SVs=9, the arithmetic operation circuit 101 makes an affirmative decision in step S193 to proceed to step S194, whereas if SVs≠9, it makes a negative decision in step S193 to proceed to step S195. In step S194, the arithmetic operation circuit 101 transmits an instruction for the display device 109 to turn on "1600" at the segment group 203 and then the operation proceeds to step S184.

In step S195, the arithmetic operation circuit 101 makes a decision as to whether or not SVs is currently set to 10 (HI-1). If SVs=10, the arithmetic operation circuit 101 makes an affirmative decision in step S195 to proceed to step S196, whereas if SVs≠10, it makes a negative decision in step S195 to proceed to step S197. Instep S196, the arithmetic operation circuit 101 transmits an instruction for the display device 109 to turn on "HI-1" at the segment group 203 and then the operation proceeds to step S184. In step S197, the arithmetic operation circuit 101 transmits an instruction for the display device 109 to turn on "HI-2" at the segment group 203 and then the operation proceeds to step S184.

In step S184, the arithmetic operation circuit 101 transmits an instruction for the display device 109 to turn on "ISO" at the segment 201, and then ends the processing shown in FIG. 9 before the operation returns to step S101 in FIG. 5.

Figure 15A:
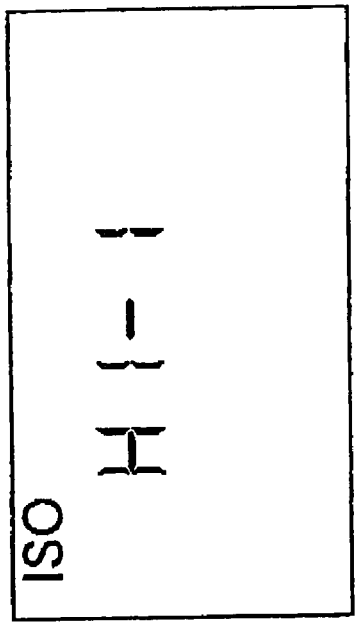
FIGS. 15A~15C present display examples that may be brought up at the display device.
Figure 15B:
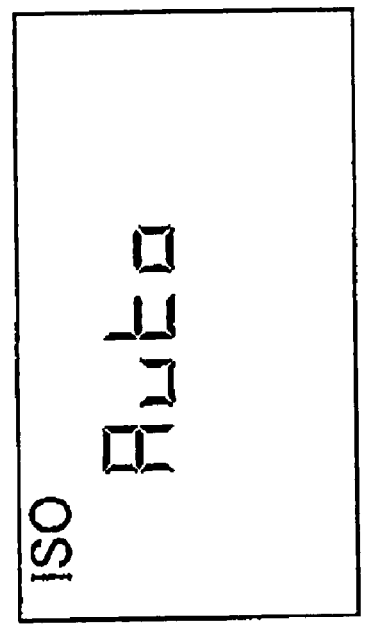
Figure 15C:
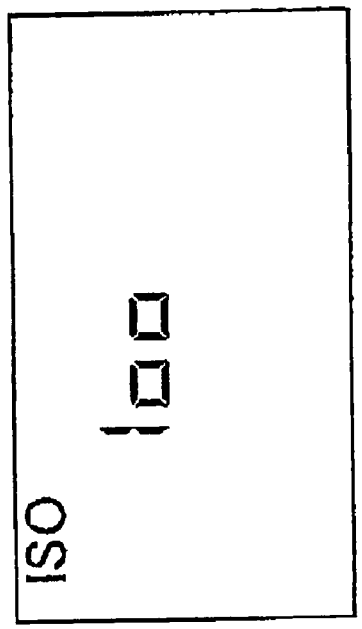

FIGS. 15A~15C present examples of displays that may be brought up at the display device 109. In the display example in FIG. 15A brought up while the imaging sensitivity button is depressed, "ISO" and "100" are in an ON state through the processing executed in step S184 and step S186. In FIG. 15B presenting another example of display brought up while the imaging sensitivity button is depressed, "ISO" and "HI-1" are in an ON state through the processing executed in step S184 and step S196. In FIG. 15C presenting yet another example of display brought up when the imaging sensitivity button is depressed, "ISO" and "Auto" are in an ON state through the processing executed in step S184 and step S183. When "Auto" is in an ON state at the segment 203, the "imaging sensitivity auto setting" is on.

(Exposure Calculation Processing)

Figure 10:
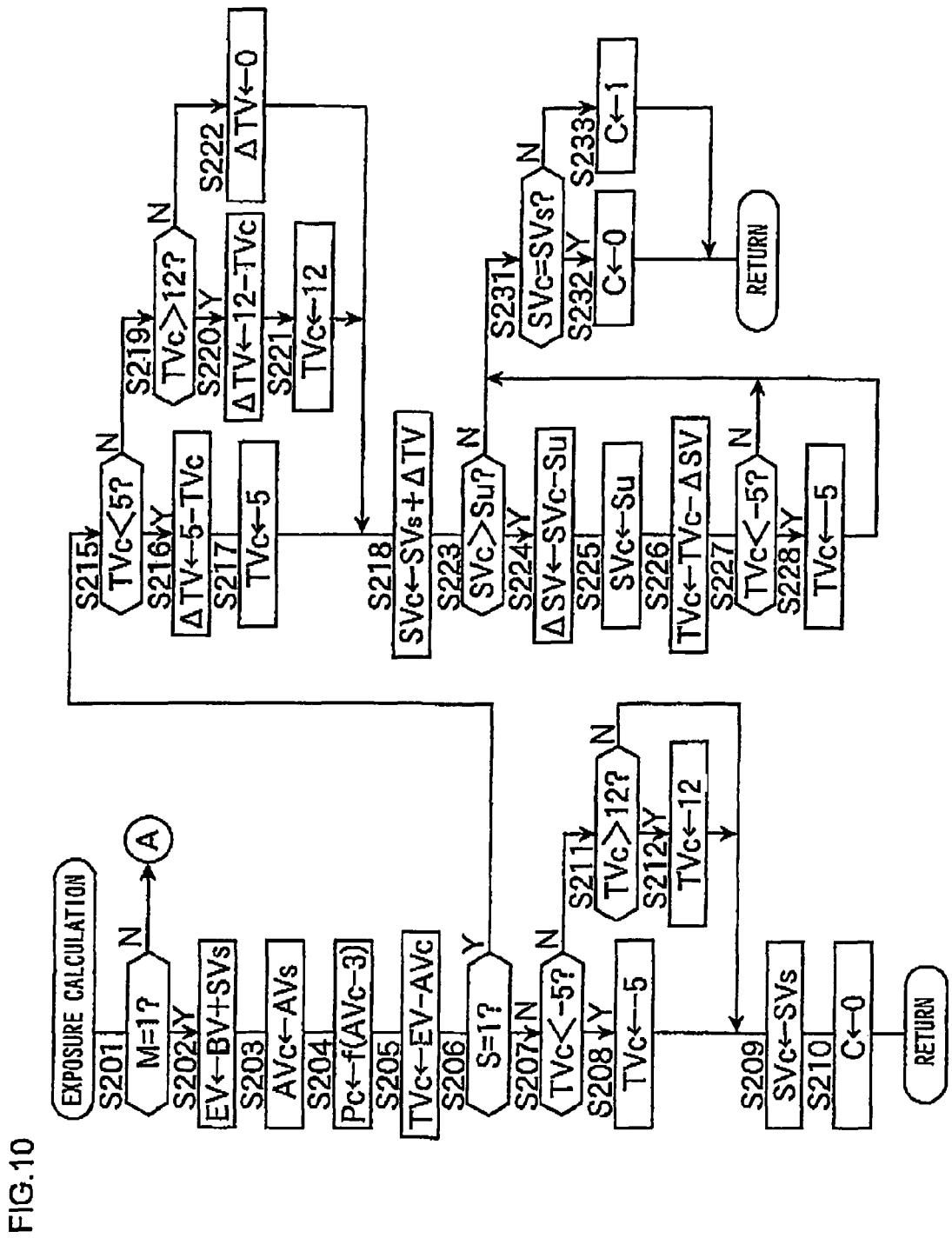
FIG. 10 presents a flowchart of the exposure calculation processing executed in the arithmetic operation circuit.
Figure 11:
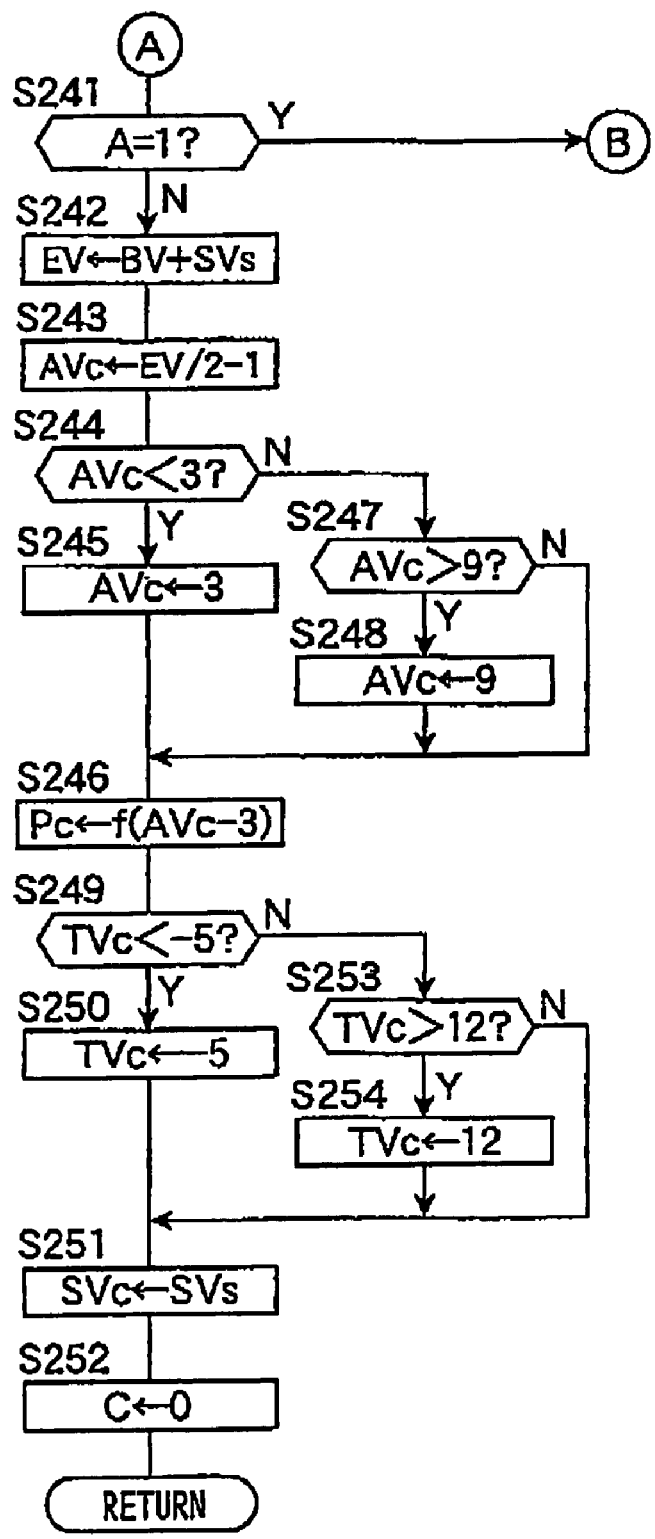
FIG. 11 presents a flowchart of the exposure calculation processing executed in the arithmetic operation circuit.
Figure 12:
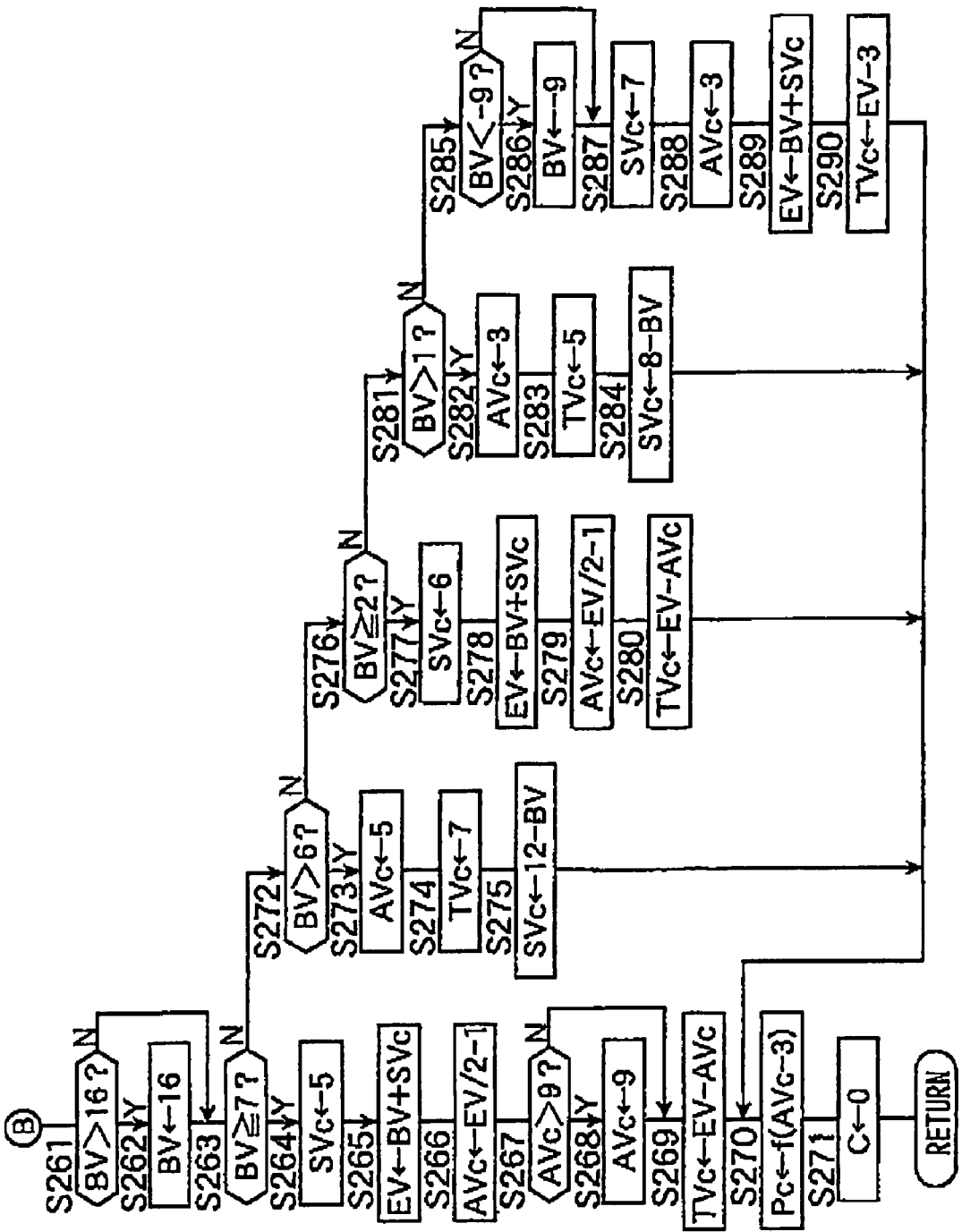
FIG. 12 presents a flowchart of the exposure calculation processing executed in the arithmetic operation circuit.

The exposure calculation processing executed in step S4 in FIG. 4 is now explained in detail in reference to the flowchart presented in FIGS. 10 through 12. In step S201 in FIG. 10, the arithmetic operation circuit 101 makes a decision as to whether or not the photographing mode flag N is currently set to 1. If M=1 (A mode), the arithmetic operation circuit 101 makes an affirmative decision in step S201 to proceed to step S202, whereas if M≠1 (i.e., if the auto mode is currently selected in this example), it makes a negative decision in step S201 to proceed to step S241 in FIG. 11.

In step S202, the arithmetic operation circuit 101 executes an arithmetic operation expressed as EV=BV+SVs by using the subject luminance BV calculated in step S3, and then the operation proceeds to step S203. EV represents the exposure value. The imaging sensitivity setting SVs is the imaging sensitivity having been set through the settings processing. It is to be noted that EV, BV and SVs are each indicated by using an apex value.

In step S203, the arithmetic operation circuit 101 sets the aperture value setting AVs as the control aperture value AVc, before the operation proceeds to step S204. AVc and AVs are each indicated by using an apex value. In step S204, the arithmetic operation circuit 101 calculates a control aperture pulse number Pc indicating the number of control aperture pulses as a function f of the number of aperture setting steps (AVc−3) and then the operation proceeds to step S205. The control aperture pulse number Pc indicates the number of detection pulses output from the aperture position detection device 107 before the aperture becomes engaged at the position corresponding to the control aperture value AVc. While the number of aperture setting steps and the number of aperture pulses are in proportion to each other, the control aperture pulse number is calculated as the function f of the number of aperture setting steps (AVc−3), since a great number of aperture detection pulses are output in the vicinity of the open aperture setting.

In step S205, the arithmetic operation circuit 101 sets the value obtained by subtracting the control aperture value AVc from the exposure value EV as a control shutter speed TVc and then the operation proceeds to step S206. TVc is indicated by using an apex value. In step S206, the arithmetic operation circuit 101 makes a decision as to whether or not the sensitivity auto control mode flag S is currently set to 1. The arithmetic operation circuit 101 makes an affirmative decision in step S206 if S=1 (if the sensitivity auto control mode is currently set) to proceed to step S215, whereas it makes a negative decision in step S206 if S=0 (if the sensitivity auto control mode has been cleared) to proceed to step S207.

In step S207, the arithmetic operation circuit 101 makes a decision as to whether or not TVc<−5 is true. The arithmetic operation circuit 101 makes an affirmative decision in step S207 if TVc<−5 is true (if the control shutter speed is lower than 30 sec) to proceed to step S208, whereas it makes a negative decision in step S207 if TVc<−5 is not true and, in this case, the operation proceeds to step S211. In step S208, the arithmetic operation circuit 101 sets −5 for the control shutter speed TVc and then the operation proceeds to step S209. As a result, the control shutter speed is set to 30 sec, which is the lower limit of the control range.

In step S211, the arithmetic operation circuit 101 makes a decision as to whether or not TVc>12 is true. The arithmetic operation circuit 101 makes an affirmative decision in step S211 if TVc>12 is true (if the control shutter speed is higher than 1/4000 sec) to proceed to step S212, whereas it makes a negative decision in step S211 if TVc>12 is not true and, in this case, the operation proceeds to step S209. In step S212, the arithmetic operation circuit 101 sets 12 for the control shutter speed TVc and then the operation proceeds to step S209. As a result, the control shutter speed is set to 1/4000 sec, which is the upper limit of the control range.

In step S209, the arithmetic operation circuit 101 sets the current value of the imaging sensitivity setting SVs for the control imaging sensitivity SVc and then the operation proceeds to step S210. In step S210, the arithmetic operation circuit 101 sets 0 at a flag C, and ends the processing in FIG. 10. The operation subsequently proceeds to step 5S in FIG. 4. The flag C is set to 1 when the imaging sensitivity is altered from the imaging sensitivity setting SVs (SVc≠SVs) and is set to D if the imaging sensitivity remains unchanged from the imaging sensitivity setting SVs (SVc=SVs).

The processing executed from step S201 through S212 as described above corresponds to the exposure calculation executed when the "A mode" is set as the photographing mode and the "sensitivity auto control mode" has been cleared.

In step S215, to which the operation proceeds after making an affirmative decision in step S206 as described above, the arithmetic operation circuit 101 makes a decision as to whether or not TVc<5 is true. The arithmetic operation circuit 101 makes an affirmative decision in step S215 if TVc<5 is true (if the control shutter speed is lower than 1/30 sec) to proceed to step S216, whereas it makes a negative decision in step S215 if TVC<5 is not true and, in this case, the operation proceeds to step S219. In step S216, the arithmetic operation circuit 101 designates the value obtained by subtracting the control shutter speed TVc from the apex value 5 as ΔTV, before the operation proceeds to step S217.

In step S217, the arithmetic operation circuit 101 sets 5 for the control shutter speed TVc and then the operation proceeds to step S218. As a result, the control shutter speed is set to a specific value (i.e., 1/30 sec defined as a shaky hand movement limit in the embodiment).

In step S219, the arithmetic operation circuit 101 makes a decision as to whether or not TVc>12 is true. The arithmetic operation circuit 101 makes an affirmative decision in step S219 if TVc>12 is true (if the control shutter speed is higher than 1/4000 sec) to proceed to step S220, whereas it makes a negative decision in step S219 if TVc>12 is not true and, in this case, the operation proceeds to step S222. In step S220, the arithmetic operation circuit 101 designates the value obtained by subtracting the control shutter speed TVc from the apex value 12 as ΔTV, before the operation proceeds to step S221.

In step S221, the arithmetic operation circuit 101 sets 12 for the control shutter speed TVc before the operation proceeds to step S218. Thus, the control shutter speed is set to 1/4000 seconds, which is the upper limit of the control range. In step S222, the arithmetic operation circuit 101 sets 0 for ΔTV and then the operation proceeds to step S218.

In step S218, the arithmetic operation circuit 101 sets the value obtained by adding ΔTV to the control imaging sensitivity SVs as a new control imaging sensitivity SVc and then the operation proceeds to step S223. In step S223, the arithmetic operation circuit 101 makes a decision as to whether or not SVc>Su is true. The arithmetic operation circuit 101 makes an affirmative decision in step S223 if the control imaging sensitivity SVc is higher than the imaging sensitivity adjustment upper limit Su to proceed to step S224, whereas it makes a negative decision in step S223 if the control imaging sensitivity SVc is not higher than the imaging sensitivity adjustment upper limit Su and, in this case, the operation proceeds to step S231.

In step S224, the arithmetic operation circuit 101 designates the value obtained by subtracting the imaging sensitivity adjustment upper limit Su from the control imaging sensitivity SVc as ΔSV, before the operation proceeds to step S225. In step S225, the arithmetic operation circuit 101 sets the value indicating the imaging sensitivity adjustment upper limit Su as the control imaging sensitivity SVc and then the operation proceeds to step S226.

In step S226, the arithmetic operation circuit 101 designates the value obtained by subtracting ΔSV from the control shutter speed TVc as a new control shutter speed TVc before the operation proceeds to step S227. In step S227, the arithmetic operation circuit 101 makes a decision as to whether or not TVc<-5 is true. The arithmetic operation circuit 101 makes an affirmative decision in step S227 if TVc<-5 is true (if the control shutter speed is lower than 30 sec) to proceed to step S228, whereas it makes a negative decision in step S227 if TVc<-5 is not true and, in this case, the operation proceeds to step S231. In step S228, the arithmetic operation circuit 101 sets -5 for the control shutter speed TVc and then the operation proceeds to step S231. As a result, the control shutter speed is set to 30 sec, which is the lower limit of the control range.

In step S231, the arithmetic operation circuit 101 makes a decision as to whether or not SVc=SVs is true. The arithmetic operation circuit 101 makes an affirmative decision in step S231 if SVc=SVs is true to proceed to step S232, whereas it makes a negative decision in step S231 if SVc=SVs is not true to proceed to step S233.

In step S232, the arithmetic operation circuit 101 sets 0 at the flag C, and ends the processing shown in FIG. 10, before the operation proceeds to step S5 in FIG. 4. In step S233, the arithmetic operation circuit 101 sets 1 at the flag C, and ends the processing shown in FIG. 10, before the operation proceeds to step S5 in FIG. 4.

The processing executed from step S215 through S233 as described above corresponds to the exposure calculation executed when the "A mode" is set as the photographing mode and the "sensitivity auto control mode" has been selected.

In step S241 in FIG. 11, to which the operation proceeds after making a negative decision in step S201 as described above, the arithmetic operation circuit 101 makes a decision as to whether or not the sensitivity auto setting mode flag A is currently set to 1. If A=1 (if the imaging sensitivity auto setting is on), the arithmetic operation circuit 101 makes an affirmative decision in step S241 to proceed to step S261 in FIG. 12, whereas if A≠1 (if the imaging'sensitivity auto setting is off), the arithmetic operation circuit makes a negative decision in step S241 to proceed to step S242.

In step S242, the arithmetic operation circuit 101 executes an arithmetic operation expressed as EV=BV+SVs by using the subject luminance BV having been calculated in step S3 and then the operation proceeds to step S243. In step S243, the arithmetic operation circuit 101 executes an arithmetic operation expressed as AVc=EV/2-1 before the operation proceeds to step S244. AVc represents the control aperture value.

In step S244, the arithmetic operation circuit 101 makes a decision as to whether or not the control aperture value AVc is smaller than F 2.8. The arithmetic operation circuit 101 makes an affirmative decision in step S244 if AVc<3 is true to proceed to step S245, whereas it makes a negative decision in step S244 if AVc<3 is not true and, in this case, the operation proceeds to step S247. In step S245, the arithmetic operation circuit 101 sets the control aperture value AVc to 3 (F 2.8 corresponding to the open aperture) and then the operation proceeds to step S246.

In step S247, the arithmetic operation circuit 101 makes a decision as to whether or not the control aperture value AVc is greater than F 22. The arithmetic operation circuit 101 makes an affirmative decision in step S247 if AVc>9 is true to proceed to step S248, whereas it makes a negative decision in step S247 if AVc>9 is not true to proceed to step S246. In step S248, the arithmetic operation circuit 101 sets the control aperture value AVc to 9 (F 22 corresponding to the smallest aperture) and then the operation proceeds to step S246.

In step S246, the arithmetic operation circuit 101 calculates the control aperture pulse number Pc as the function f of the number of aperture setting steps (AVc-3) and then the operation proceeds to step S249. Since the processing executed in steps S249 through S254 is identical to the processing executed in steps S207 through S212 in FIG. 10, its explanation is omitted.

The processing executed from stop S241 through step S254 as described above corresponds to the exposure calculation executed when the "auto mode" is set for the photographing mode and the imaging sensitivity is selected through user operation.

In step S261 in FIG. 12, to which the operation proceeds after making an affirmative decision in step S241 as described above, the arithmetic operation circuit 101 makes a decision as to whether or not the subject luminance BV is greater than 16. If BV>16 is true, the arithmetic operation circuit 101 makes an affirmative decision in step S261 to proceed to step S262. If, on the other hand, BV>16 is not true, the arithmetic operation circuit makes a negative decision in step S261 to proceed to step S263. In step S262, the arithmetic operation circuit 101 sets 16 (control limit) for the luminance BV and then the operation proceeds to step S263.

In step S263, the arithmetic operation circuit 101 makes a decision as to whether or not the subject luminance BV is equal to or greater than 7. If BV≧7 is true, the arithmetic operation circuit 101 makes an affirmative decision in step S263 to proceed to step S264. If, on the other hand, BV≧7 is not true, the arithmetic operation circuit makes a negative decision in step S263 to proceed to step S272.

In step S264, the arithmetic operation circuit 101 sets the control imaging sensitivity SVc to 5 (ISO 100) and then the operation proceeds to step S265. In step S265, the arithmetic operation circuit 101 executes an arithmetic operation expressed as EV=BV+SVc to determine the exposure value EV, before the operation proceeds to step S266. In step S266, the arithmetic operation circuit 101 executes in arithmetic operation expressed as AVc=EV/2−1 and then the operation proceeds to step S267.

Instep S267, the arithmetic operation circuit 101 makes a decision as to whether or not the control aperture value AVc is greater than F 22. The arithmetic operation circuit 101 makes an affirmative decision in step S267 if AVc>9 is true to proceed to step S268, whereas it makes a negative decision in step S267 if AVc>9 is not true and, in this case, the operation proceeds to step S269. In step S268, the arithmetic operation circuit 101 sets the control aperture value AVc to 9 (F 22 corresponding to the smallest aperture) and then the operation proceeds to step S269.

In step S269, the arithmetic operation circuit 101 designates the value obtained by subtracting the control aperture value AVc from the exposure value EV as the control shutter speed TVc and then the operation proceeds to step S270. In step S270, the arithmetic operation circuit 101 calculates the control aperture pulse number Pc as the function f of the number of aperture setting steps (AVc−3), before the operation proceeds to step S271. In step S271, the arithmetic operation circuit 101 sets the flag C to 0, and ends the processing shown in FIG. 12 before the operation proceeds to step S5 in FIG. 4.

In step S272, to which the operation proceeds after making a negative decision in step S263, the arithmetic operation circuit 101 makes a decision as to whether or not BV>6 is true with regard to the subject luminance BV. The arithmetic operation circuit 101 makes an affirmative decision in step S272 if Bv>6 is true to proceed to step S273, whereas it makes a negative decision in step S272 if BV>6 is not true and, in this case, the operation proceeds to step S276.

In step S273, the arithmetic operation circuit 101 sets 5 (F 5.6) for the control aperture value AVc and then the operation proceeds to step S274. Instep S274, the arithmetic operation circuit 101 sets 7 (1/125 sec) for the control shutter speed TVc before the operation proceeds to step S275. Instep S275, the arithmetic operation circuit 101 designates the value obtained by subtracting the subject luminance BV from the apex value 12 as the control imaging sensitivity SVc and then the operation proceeds to step S270.

In step S276, to which the operation proceeds after making a negative decision in step S272, the arithmetic operation circuit 101 makes a decision as to whether or not the subject luminance BV is equal to or greater than 2. If BV≧2 is true, the arithmetic operation circuit 101 makes an affirmative decision in step S276 to proceed to step S277. If, on the other hand, BV≧2 is not true, the arithmetic operation circuit makes a negative decision in step S276 to proceed to step S281.

In step S277, the arithmetic operation circuit 101 sets the control imaging sensitivity SVc to 6 (ISO 200) and then the operation proceeds to step S278. In step S278, the arithmetic operation circuit 101 executes an arithmetic operation expressed as EV=BV+SVc to determine the exposure value EV, before the operation proceeds to step S279. Instep S279, the arithmetic operation circuit 101 executes an arithmetic operation expressed as AVc=EV/2−1 to determine the control aperture value AVc and then the operation proceeds to step S280. In step S280, the arithmetic operation circuit 101 designates the value obtained by subtracting the control aperture value AVc from the exposure value EV as the control shutter speed TVc before the operation proceeds to step S270.

In step S281, to which the operation proceeds after making a negative decision in step S276, the arithmetic operation circuit 101 makes a decision as to whether or not BV>1 is true with regard to the subject luminance BV. The arithmetic operation circuit 101 makes an affirmative decision in step S281 if BV>1 is true to proceed to step S2S2, whereas it makes a negative decision in step S281 if BV>1 is not true and, in this case, the operation proceeds to step S285.

In step S282, the arithmetic operation circuit 101 sets 3 (F 2.8) for the control aperture value AVc and then the operation proceeds to step S283. Instep S283, the arithmetic operation circuit 101 sets 5 (1/30 sec) for the control shutter speed TVc before the operation proceeds to step S284. Instep S284, the arithmetic operation circuit 101 designates the value obtained by subtracting the subject luminance BV from the apex value 8 as the control imaging sensitivity SVc and then the operation proceeds to step S270.

In step S285, to which the operation proceeds after making a negative decision in step S281, the arithmetic operation circuit 101 makes a decision as to whether or not BV<−9 is true with regard to the subject luminance BV. The arithmetic operation circuit 101 makes an affirmative decision in step S285 if BV<−9 is true to proceed to step S286, whereas it makes a negative decision in step S285 if BV<−9 is not true and, in this case, the operation proceeds to step S287.

In step S286, the arithmetic operation circuit 101 sets the luminance BV to −9 (control limit) and then the operation proceeds to step S287. In step S287, the arithmetic operation circuit 101 sets the control imaging sensitivity SV to 7 (ISO 400) before the operation proceeds to step S288. Instep S288, the arithmetic operation circuit 101 sets the control aperture value AVc to 3 (F 2.8) and then the operation proceeds to step S289.

In step S289, the arithmetic operation circuit 101 executes an arithmetic operation expressed as EV=BV+SVc to determine the exposure value EV before the operation proceeds to step S290. Instep S290, the arithmetic operation circuit 101 designates the value obtained by subtracting 3 (AVc) from the exposure value EV as the control shutter speed TVc and then the operation proceeds to step S270.

The processing executed in step S261 through S290 as described above corresponds to the exposure calculation executed when the "auto mode" is set as the photographing mode and the "imaging sensitivity auto setting" is on.

(Display Processing)

Figure 13:
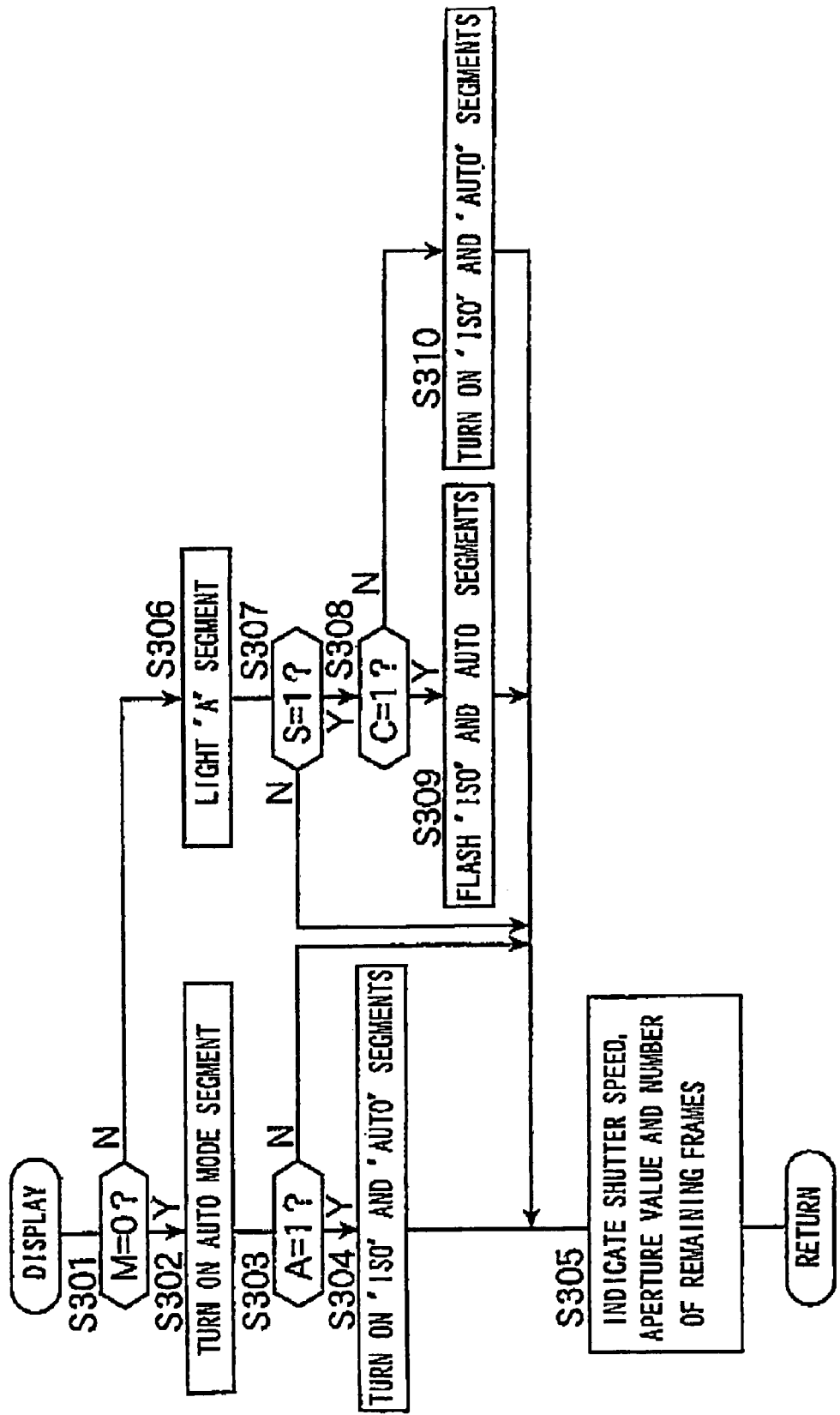
FIG. 13 presents a flowchart of the display processing executed in the arithmetic operation circuit.

The display processing executed in step 6 in FIG. 4 is now described in detail in reference to the flowchart presented in FIG. 13. In step S301 in FIG. 13, the arithmetic operation circuit 101 makes a decision as to whether or not the photographing mode flag M is currently set to 0. If M=0 (auto mode), the arithmetic operation circuit 101 makes an affirmative decision in step S301 to proceed to step S302, whereas if M≠0 (i.e., if the A mode is currently selected in this example), it makes a negative decision in step S301 to proceed to step S306.

In step S302, the arithmetic operation circuit 101 transmits an instruction for the display device 109 to turn on the segment 205 to indicate "auto mode", before the operation proceeds to step S303. In step S303, the arithmetic operation circuit 101 makes a decision as to whether or not the sensitivity auto setting mode flag A is currently set to 1. The arithmetic operation circuit 101 makes an affirmative decision in step S303 if A=1 (if the imaging sensitivity auto setting is on) to proceed to step S304, whereas it makes a negative decision in step S303 if A≠1 (if the imaging sensitivity auto setting is off) and, in this case, the operation proceeds to step S305.

In step S304, the arithmetic operation circuit 101 transmits an instruction for the display device 109 to turn on "ISO" at the segment 201 and "Auto" at the segment 202, and then the operation proceeds to step S305.

In step S306, to which the operation proceeds after making a negative decision in step S301, the arithmetic operation circuit 101 transmits an instruction for the display device 109 to turn on the segment 206 to indicate "A mode" and then the operation proceeds to step S307. In step S307, the arithmetic operation circuit 101 makes a decision as to whether or not the sensitivity auto control mode flag S is currently set to 1. The arithmetic operation circuit 101 makes an affirmative decision in step S307 if S=1 (if the sensitivity auto control mode is selected) to proceed to step S308, whereas it makes a negative decision in step S307 if S=0 (if the sensitivity auto control mode has been cleared) to proceed to step S305.

In step S308, the arithmetic operation circuit 101 makes a decision as to whether or not the flag C is currently set to 1. The arithmetic operation circuit 101 makes an affirmative decision in step S308 if C=1 (if the imaging sensitivity has been altered from the imaging sensitivity setting SVs in the sensitivity auto control mode) to proceed to step S309, whereas it makes a negative decision in step S308 if C=0 (if the imaging sensitivity has remained unchanged from the imaging sensitivity setting SVs) and, in this case, the operation proceeds to step S310.

In step S309, the arithmetic operation circuit 101 transmits an instruction for the display device 109 to flash "ISO" at the segment 201 and "Auto" at the segment 202, before the operation proceeds to step S305. In step S310, the arithmetic operation circuit 101 transmits an instruction for the display device 109 to turn on "ISO" at the segment 201 and "Auto" at the segment 202 and then the operation proceeds to step S305.

In step S305, the arithmetic operation circuit 101 transmits an instruction for the display device 109 to bring up a display indicating the shutter speed, the aperture value and the number of remaining frames and ends the processing shown in FIG. 13. The operation subsequently proceeds to step S7 in FIG. 4.

(Imaging Sequence Processing)

Figure 14:
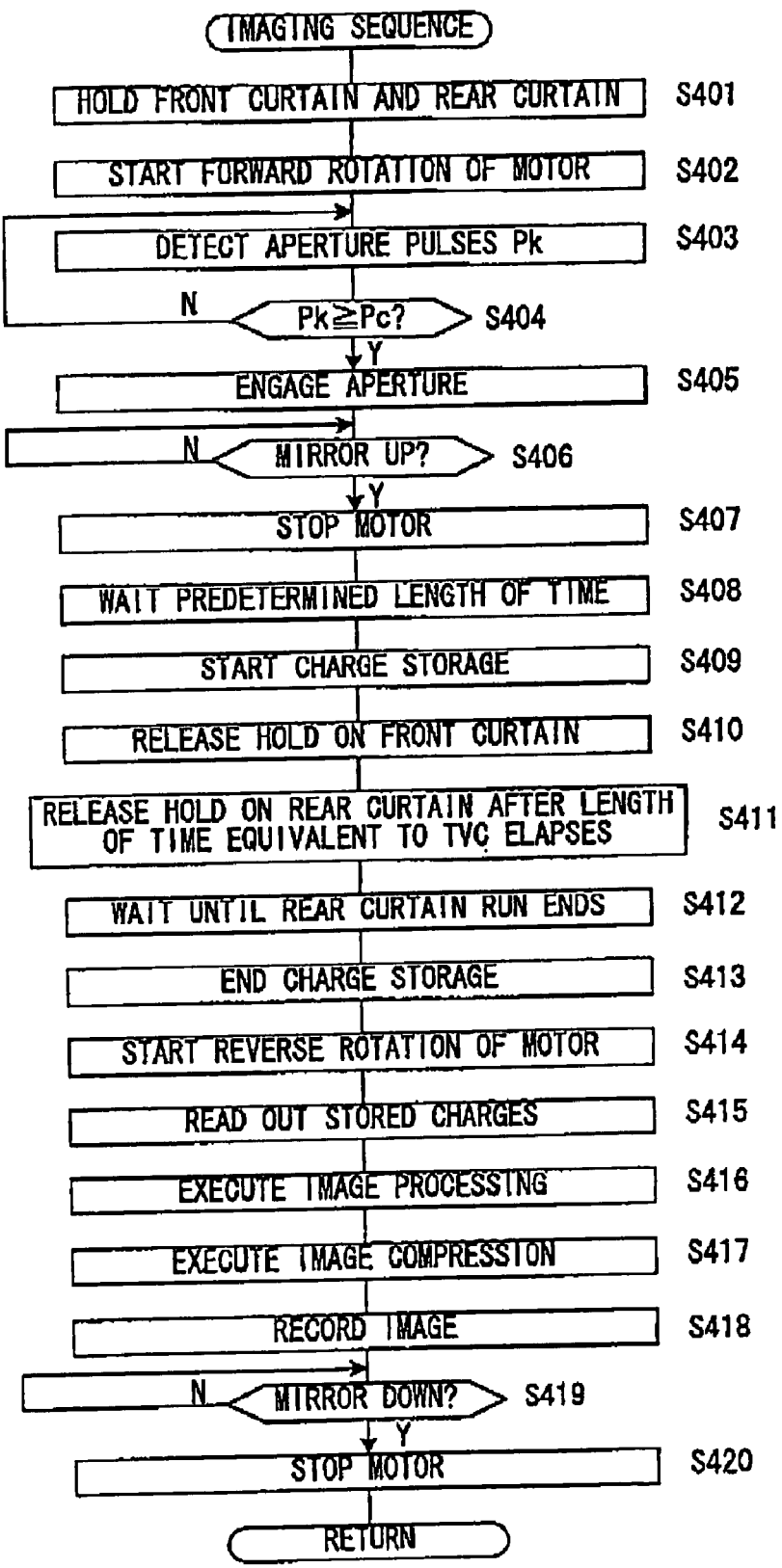
FIG. 14 presents a flowchart of the imaging sequence processing executed in the arithmetic operation circuit.

The imaging sequence processing executed in step S8 in FIG. 4 is explained in detail in reference to the flowchart presented in FIG. 14. In step S401 in FIG. 14, the arithmetic operation circuit 101 outputs an instruction for the shutter control circuit 103 to supply power to magnets (not shown) at the shutter 104 so as to keep both the front curtain and the rear curtain on hold. In step S402, the arithmetic operation circuit 101 outputs an instruction for the motor control circuit 105 to start a forward rotation of the sequence motor 106 before the operation proceeds to step S403. As a result, a mirror-up operation of the mirror (not shown) and an aperture setting operation for the aperture start.

In step S403, the arithmetic operation circuit 101 detects an aperture pulse number Pk indicating the number of aperture pulses from the signal input thereto from the aperture position detection device 107 and then the operation proceeds to step S404. In step S404, the arithmetic operation circuit 101 makes a decision as to whether or not a relationship expressed as Pk≧Pc exists between the detected aperture pulse number Pk and the control aperture pulse number Pc. The arithmetic operation circuit 101 makes an affirmative decision in step S404 if Pk≧PC is true to proceed to step S405, whereas if Pk≧Pc is not true, the arithmetic operation circuit 101 makes a negative decision in step S404. After making a negative decision, the operation returns to step S403 to continue the aperture setting operation.

In step S405, the arithmetic operation circuit 101 outputs an instruction for the aperture engaging device 108 to engage the aperture and then the operation proceeds to step S406. In step S406, the arithmetic operation circuit 101 makes a decision as to whether or not the mirror-up operation has been completed. The arithmetic operation circuit 101 makes an affirmative decision in step S406 if an ON signal has been input from the sequence switch SW1 to proceed to step S407, whereas it makes a negative decision in step S406 if an ON signal has not been input from the sequence switch SW1. After making a negative decision, the decision-making processing is repeatedly executed while the mirror-up operation continues.

In step S407, the arithmetic operation circuit 101 outputs an instruction for the motor control circuit 105 to stop the sequence motor 106, and then the operation proceeds to step S408. It is to be noted that the sequence drive device (not shown) assumes a structure that allows the aperture engaging device 108 to completely engage the aperture before the mirror-up operation ends. In step S408, the arithmetic operation circuit 101 waits in standby over a predetermined length of time (until at least any rebound occurring in the mirror-up operation stops) and then the operation proceeds to step S409.

In step S409, the arithmetic operation circuit 101 engages the timing circuit 124 in generation of a drive signal, thereby starting drive of the image sensor 121, and then the operation proceeds to step S410. In response, the image sensor 121 starts electrical charge storage.

In step S410, the arithmetic operation circuit 101 outputs an instruction for the shutter control circuit 103 to stop the power supply to the corresponding magnet (not shown) at the shutter 104 so as to release the hold on the front curtain, before the operation proceeds to step S411. In response, the shutter front curtain starts running and the image sensor 121 stores electrical charges corresponding to the intensity of the subject light having reached the imaging surface of the image sensor 121. In step S411, the arithmetic operation circuit 101 releases the hold on the rear curtain after a length of time $(=2^{-TVc})$ corresponding to the control shutter speed TVc elapses. More specifically, the arithmetic operation circuit 101 outputs an instruction for the shutter control circuit 103 to stop the power supply to the corresponding magnet (not shown) at the shutter 104, and then the operation proceeds to step S412. In response, the shutter rear curtain starts running, thereby blocking the subject light advancing toward the image sensor 121.

Instep S412, the arithmetic operation circuit 101 waits in standby until the shutter rear curtain run is completed, and then the operation proceeds to step S413. The length of this wait is set to a length of time required for the rear curtain to complete its run and completely shield the imaging area at the image sensor 121. In step S413, the arithmetic operation circuit 101 ends the electrical charge storage at the image sensor 121 before the operation proceeds to step S414. In step S414, the arithmetic operation circuit 101 outputs an instruction for the motor control circuit 105 to start a reverse rotation of the sequence motor 106 and then the operation proceeds to step S415. In response, a mirror-down operation of the mirror (not shown) and a reset operation for resetting the aperture to the open setting start. In step S415, the arithmetic operation circuit 101 outputs an instruction for the timing circuit 124 to prompt a read out of the stored electrical charges from the image sensor 121 and then the operation proceeds to step S416.

In step S416, the arithmetic operation circuit 101 engages the ASIC 123 in image processing before the operation proceeds to step S417. In step S417, the arithmetic operation circuit 101 engages the ASIC 123 in image compression processing before the operation proceeds to step S418. In step S418, the arithmetic operation circuit 101 records the image data, having been stored into the buffer memory 125 allowing the image compression, into the recording medium 26, and then the operation proceeds to step S419.

In step S419, the arithmetic operation circuit 101 makes decision as to whether or not the mirror-down operation has been completed. The arithmetic operation circuit 101 makes an affirmative decision in step S419 if an ON signal has been input from the sequence switch SW1 to proceed to step S420, whereas it makes a negative decision in step S419 if an ON signal has not been input from the sequence switch SW1 and, in this case, the decision-making processing is repeatedly executed while the mirror-down operation continues.

In step S420, the arithmetic operation circuit 101 outputs an instruction for the motor control circuit 105 to stop the sequence motor 106, thereby ending the processing shown in FIG. 14 and the operation subsequently returns to step S2 in FIG. 4. The sequence of photographing processing thus ends.

The following operations and advantages can be achieved in the embodiment described above.

(1) At least either the "auto mode" or the "A mode" may be selected as the photographing mode in the electronic camera, and the "imaging sensitivity auto setting" is allowed to enter an ON state while the electronic camera is set in the "auto mode" whereas operations in the "imaging sensitivity auto setting" ON condition are not executed if the electronic camera is set in the "A mode". Operations in the "auto mode" in which the electronic camera automatically selects settings related to the exposure (except for the imaging sensitivity) and operations under the "imaging sensitivity auto setting" ON condition in which the electronic camera automatically determines the imaging sensitivity regardless of the current imaging sensitivity setting do not conflict with each other. By allowing these operations, which do not conflict with each other, to be executed in combination, it is ensured that the user is able to ascertain the setting statuses with ease.

(2) At least either the "auto mode" or the "A mode" can be selected as the photographing mode in the electronic camera, and the "sensitivity auto control mode" can be selected while the electronic camera is set in the "A mode", whereas operations in the "sensitivity auto control mode" are not executed if the electronic camera is set in the "auto mode". Operations in the "A mode", in which the electronic camera automatically selects the exposure-related settings by using the current aperture value setting, and the sensitivity auto control under which the exposure calculation is executed based upon the current imaging sensitivity setting selected in the electronic camera and the calculated subject luminance and exposure calculation is executed again by automatically adjusting the imaging sensitivity if the optimal exposure is not achieved through the initial exposure calculation do not conflict with each other. By allowing these operations, which do not conflict with each other, to be executed in combination, it is ensured that the user is able to ascertain the setting statuses with ease.

(3) When the electronic camera is set in the "auto mode", ON/OFF instructions with regard to the "imaging sensitivity auto setting" are issued via a sensitivity setting operation member (i.e., the imaging sensitivity switch SW4 operated in response to an operation of the imaging sensitivity button). In other words, since operations related to the imaging sensitivity (imaging sensitivity adjustment operation and ON/OFF operation for the "imaging sensitivity auto setting") can be executed via a common operation member, better operability for the user is assured.

(4) when the electronic camera is set in the "A mode", instructions for setting/clearing the "sensitivity auto control mode" are issued via an operation member (i.e., the sensitivity auto control mode switch SW5 operated in response to an operation of the sensitivity auto control mode button) different from the sensitivity setting operation member. As a result, the operations for setting/clearing the sensitivity auto control mode never become mixed up with the operations in (3) above, thereby assuring better ease of operation for the user.

(5) If an instruction to switch from the "auto mode" to the "A mode" is issued while the "image sensitivity auto setting" is on, the setting having been stored at the time of the previous "A mode" operation is set as the imaging sensitivity after the change over to the "A mode". In addition, if an instruction to switch from the "auto mode" to the "A mode" is issued while the "imaging sensitivity auto setting" is off, the setting effective in the current "auto mode" is carried over as the imaging sensitivity after the change over to the "A mode". This structure allows the user to operate the camera without becoming disconcerted by a change in the imaging sensitivity when the photographing mode is altered.

(6) If no data indicating the imaging sensitivity are stored in the situation described in (5) above, that is, when information indicating the imaging sensitivity set in the previous "A mode" or information indicating the setting of the most recent "auto mode" is not stored, the default value, that is, a predetermined initial value (e.g., SVs=5) is selected as the imaging sensitivity after the change over to the "A mode". As a result, even in the event of data loss, an imaging sensitivity setting error is prevented. This may be a case where stored data has been deleted for some reasons or the "A mode" has never been selected.

(7) In response to an instruction to switch from the "A mode" to the "auto mode", the setting effective in the current "A mode" is selected as the imaging sensitivity after the change over to the "auto mode". In addition, if the "imaging sensitivity auto setting" was on while the electronic camera was set in the A mode previously, information indicating the "imaging sensitivity auto setting" ON condition is stored and the "imaging sensitivity auto setting" is turned on a gain based upon the information after the change over to the "auto mode". This structure allows the user to operate the camera without becoming disconcerted by a change in the imaging sensitivity when the photographing mode is adjusted.

(8) If an imaging sensitivity adjustment operation is executed in the "imaging sensitivity auto setting" ON condition when the electronic camera is set in the "auto mode", the imaging sensitivity is adjusted starting from the lower limit (ISO 100) of the imaging sensitivity adjustment range in response to an upward operation, the imaging sensitivity is adjusted starting at the upper limit (HI-2) of the imaging sensitivity adjustment range in response to a downward operation, and the "imaging sensitivity auto setting" is turned off in either case, thereby assuring better ease of use for the user.

(9) When the electronic camera is set in the "auto mode" and the "imaging sensitivity auto setting" is in an OFF state, the imaging sensitivity auto setting" is turned on in response to a downward operation starting at the lower limit (ISO 100) of the imaging sensitivity adjustment range or in response to an upward operation starting at the upper limit (HI-2) of the imaging sensitivity adjustment range and thus, better ease of use for the user is assured.

(10) When automatically adjusting the imaging sensitivity following a failure to achieve the optimal exposure in the electronic camera set in the "A mode" and the "sensitivity auto control mode", the imaging sensitivity is adjusted (step S218) after setting (step S217) the control shutter speed to a specific value (1/30 sec) representing a higher speed than the low-speed side control limit (30 sec). As a result, operations in the "sensitivity auto control mode" can be executed at the shutter speed (which is set to 1/30 sec in the embodiment) at which blurring attributable to shaky hand movement does not occur.

(Variation 1)

Figure 18:
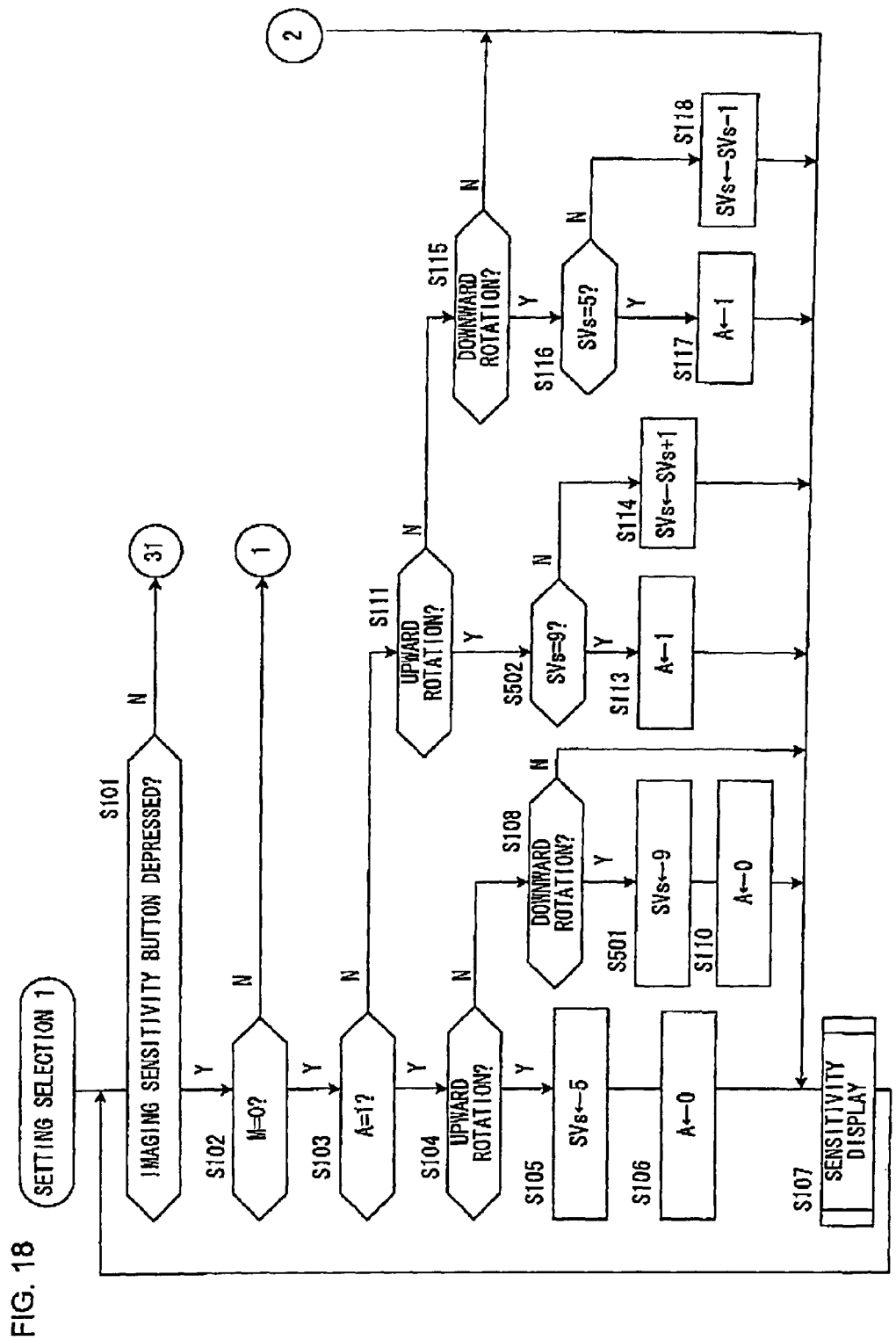
FIG. 18 presents a flowchart of a variation of the settings processing executed in the arithmetic operation circuit.
Figure 19:
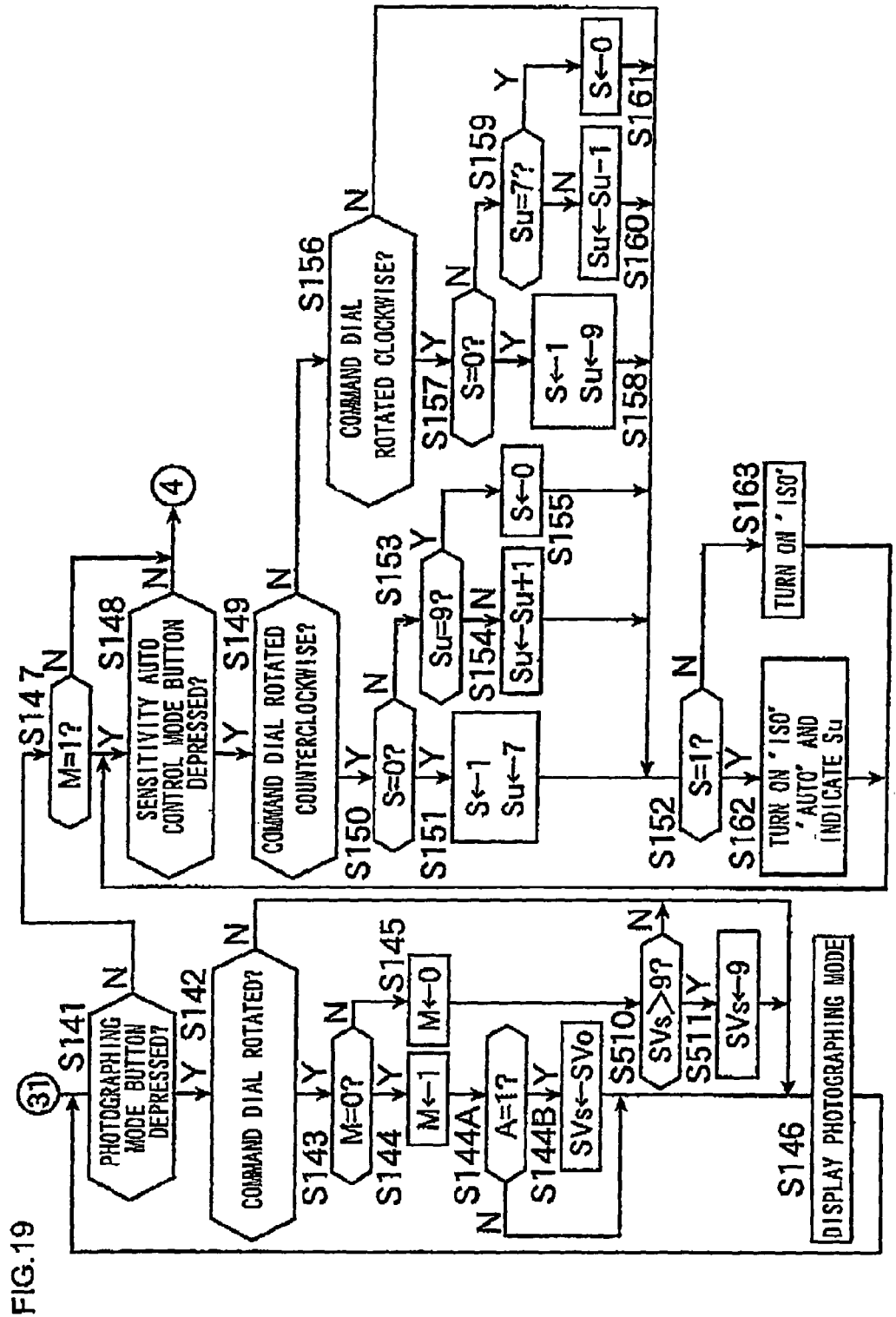
FIG. 19 presents a flowchart of a variation of the settings processing executed in the arithmetic operation circuit.

The settings processing may be executed as shown in the flowchart presented in FIG. 18 instead of the flowchart in FIG. 5 and also as shown in the flowchart presented in FIG. 19 instead of the flowchart in FIG. 7. The processing in FIG. 18 differs from that shown in FIG. 5 in that step S501 is executed in place of step S109 and step S502 is executed in place of step S112.

Figure 20:
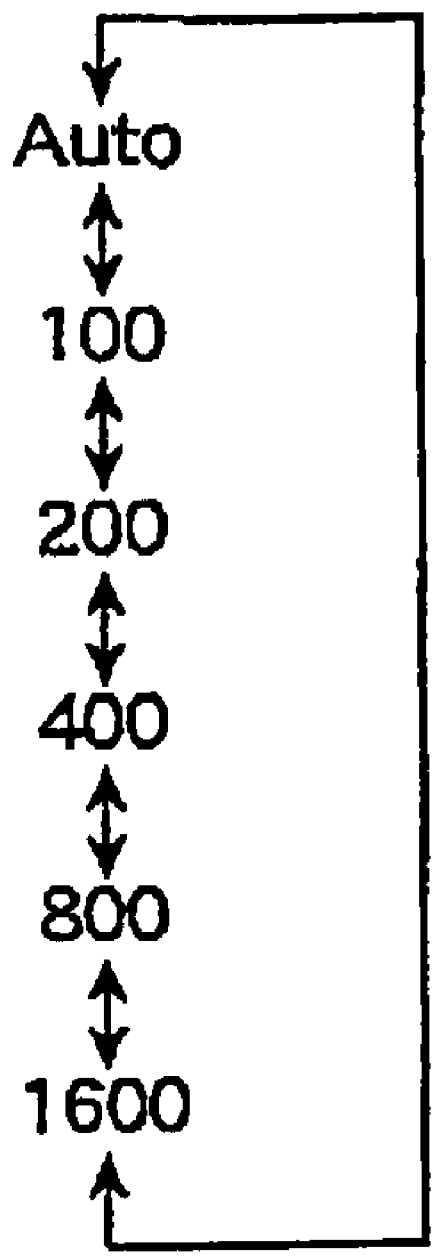
FIG. 20 presents an example of a variation of settings that may be selected in response to imaging sensitivity adjustment instructions when the "auto mode" is set for the photographing mode.

In settings processing 1 shown in FIG. 18, the imaging sensitivity setting can be selected when the "auto mode" is set for the photographing mode over a range "ISO 100" through "ISO 1600", which does not include the sensitivity levels "HI-1" and "HI-2" higher than "ISO 1600". FIG. 20 shows how the imaging sensitivity may be switched in response to imaging sensitivity adjustment instructions in the "auto mode" in variation 1. The electronic camera sequentially switches the imaging sensitivity in the order of, for instance, "Auto"-"ISO 100"-"ISO 200"-"ISO 400"-"ISO 800"-"ISO 1600"-"Auto" . . . as shown in FIG. 20.

The processing in FIG. 19 differs from the processing in FIG. 7 in that it includes additional steps S510 and S511 executed between step S145 and step S146. When the photographing mode is switched from the "A mode" to the "auto mode", the imaging sensitivity setting SVs is switched to 9 (ISO 1600) (step S511) if the imaging sensitivity setting SVs selected in the "A mode" is greater than 9 ("HI-1" or "HI-2" in this example) (when an affirmative decision is made in step S510) in the processing shown in FIG. 19.

(Variation 2)

While the "A mode" is explained as an example of a photographing mode different from the "auto mode", a "P mode" or an "S mode" may be selected instead of the "A mode". In the "P mode", the electronic camera automatically selects the exposure-related settings in correspondence to the luminance (program auto exposure mode), whereas in the "S mode", the electronic camera automatically selects the exposure-related settings based upon the current shutter speed setting (shutter speed priority auto exposure mode).

(Variation 3)

Figure 21:
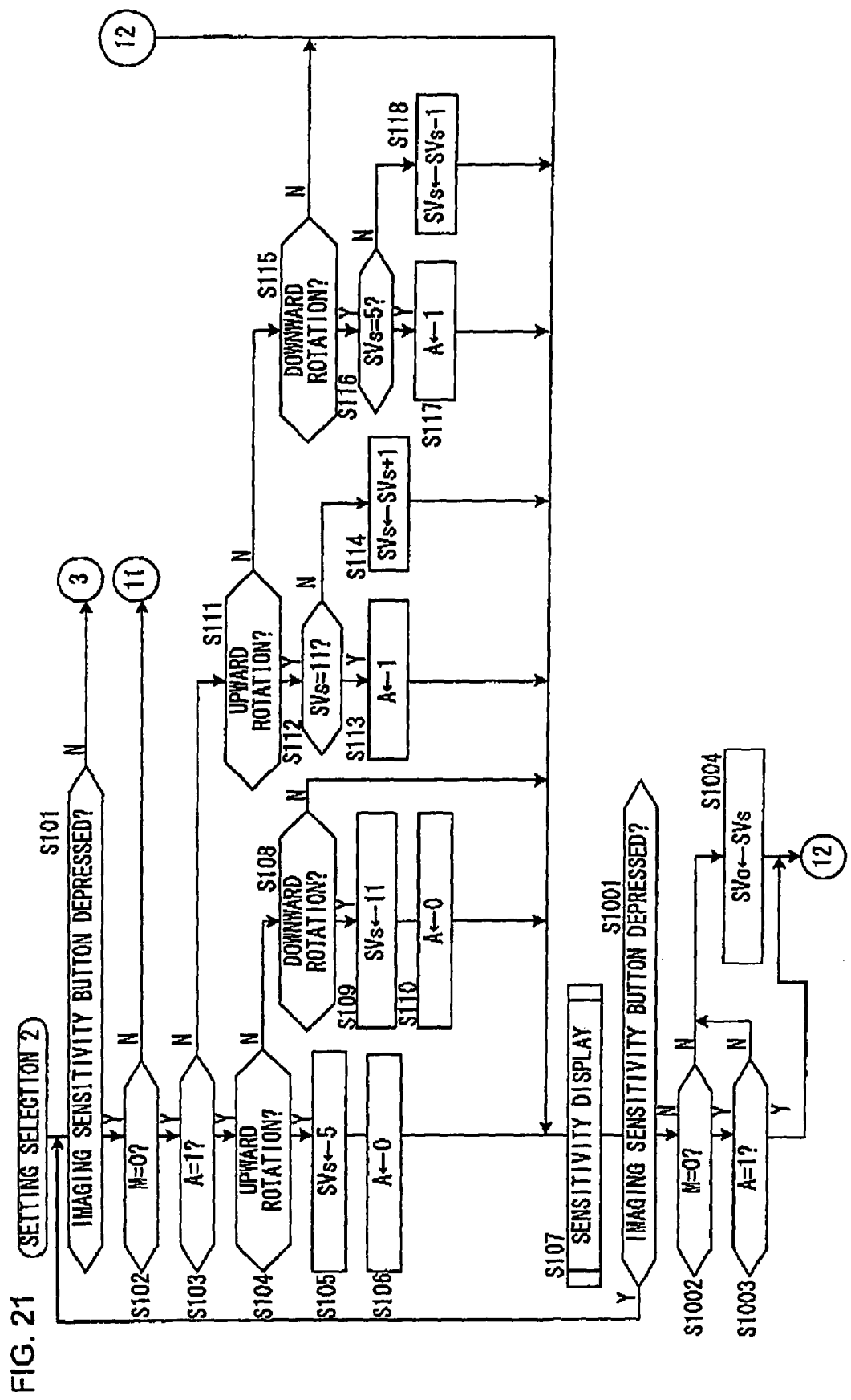
FIG. 21 presents a flowchart of a variation of the settings processing executed in the arithmetic operation circuit.
Figure 22:
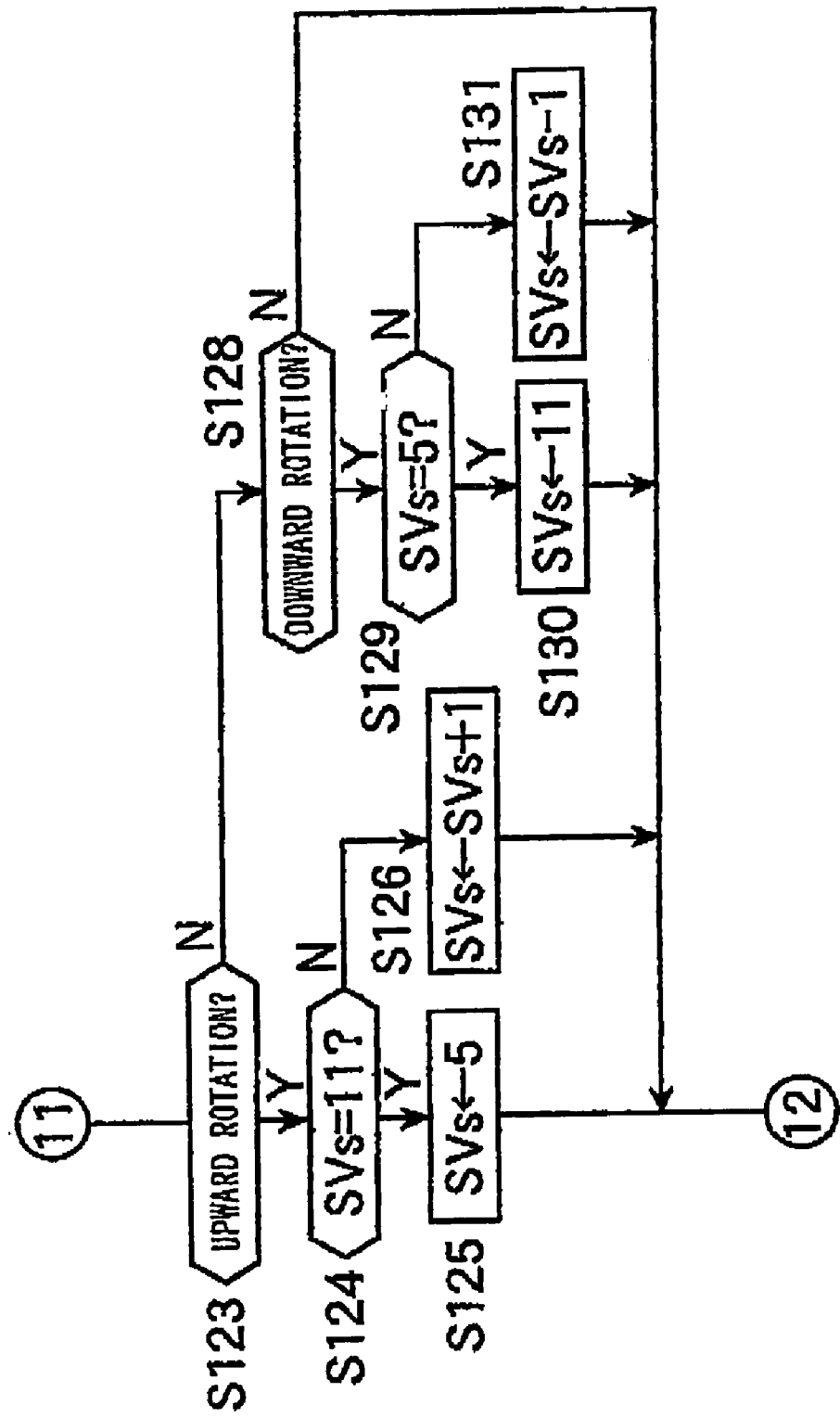
FIG. 22 presents a flowchart of a variation of the settings processing executed in the arithmetic operation circuit.

The settings processing may be executed as shown in the flowchart presented in FIG. 21 instead of the flowchart in FIG. 5 and also as shown in the flowchart presented in FIG. 22 instead of the flowchart in FIG. 6. The processing shown in FIG. 21 differs from the processing shown in FIG. 5 in that it includes additional steps S1001 through S1004 executed after step S107. The processing in FIG. 22 differs from the processing shown in FIG. 6 in that step S127 is not executed in the processing in FIG. 22. The imaging sensitivity having been stored at the time of the previous "A mode" operation is set for the imaging sensitivity after the change over to the "A mode" in response to an instruction to switch from the "auto mode" to the "A mode" issued in the "imaging sensitivity auto setting" ON condition in the embodiment described above. In variation 3, however, either the imaging sensitivity having been set in the "auto mod" under the "imaging sensitivity auto setting" OFF condition or the imaging sensitivity having been stored at the time of the previous "A mode" operation, whichever setting that was selected more recently, is set as the imaging sensitivity after the change over to the "A mode" in response to an instruction to switch from the "auto mode" to the "A mode" issued under the "imaging sensitivity auto setting" ON condition. By setting the value manually selected by the user most recently as the imaging sensitivity, the sense of disruption that may be experienced by the user as the imaging sensitivity is altered in response to a switch in the photographing mode can be further reduced.

The above described embodiments are examples and various modifications can be made without departing from the scope of the invention.

What is claimed is:

1. An electronic camera, comprising:
an imaging device that captures a subject image through a photographic lens;
a luminance detection device that detects subject luminance;
a selection device that selects one of a first mode in which an exposure calculation is executed by using an exposure sensitivity set at the imaging device and the subject luminance detected by the luminance detection device and a first control exposure is determined through an arithmetic operation with regard to at least one of an exposure time period set at the imaging device and an aperture value set at the photographing lens so as to achieve optimal exposure if the optimal exposure is not achieved through the initial exposure calculation, and a second mode in which a second control exposure is automatically determined through an arithmetic operation with regard to the aperture value and the exposure time period so as to achieve the optimal exposure;
a first control circuit that executes the exposure calculation again by adjusting the exposure sensitivity if the first control exposure determined in the first mode does not achieve the optimal exposure;
a second control circuit that automatically sets the exposure sensitivity at the imaging device in correspondence to the subject luminance detected by the luminance detection device; and
a third control circuit that disallows the second control circuit from operating and allows the first control circuit to operate when the first mode is selected, and that disallows the first control circuit from operating and allows the second control circuit to operate when the second mode is selected.

2. An electronic camera according to claim 1, wherein:
an instruction for allowing the second control circuit to operate when the second mode is selected is output from a sensitivity setting operation member operated to set the exposure sensitivity at the imaging device.

3. An electronic camera according to claim 2, wherein:
an instruction for allowing the first control circuit to operate when the first mode is selected is output from an operation member other than the sensitivity setting operation member.

4. An electronic camera according to claim 2, further comprising:
a storage device in which information indicating the exposure sensitivity having been set most recently with the first mode selected and information indicating contents of an instruction having been most recently issued via the sensitivity setting operation member with the second mode selected are stored, wherein:
(1) the third control circuit selects the first mode instead of the second mode and sets the most recent exposure sensitivity indicated in the information stored in the storage device as the exposure sensitivity at the imaging device in response to a switching instruction received from the selection device when the second mode is selected and the second control circuit is allowed to operate; and (2) the third control circuit selects the first mode instead of the second mode and sets an exposure sensitivity corresponding to the contents of the most recent instruction issued via the sensitivity setting operation member, indicated in the information stored in the storage device, as the exposure sensitivity at the imaging device in response to the switching instruction received when the second mode is selected and engagement of the second control circuit is not allowed to operate.

5. An electronic camera according to claim 4, wherein:
the third control circuit selects the first mode instead of the second mode and sets the exposure sensitivity at the imaging device to a predetermined sensitivity level if information indicating the most recent exposure sensitivity having been set with the first mode selected or information indicating the most recent exposure sensitivity having been set with the second mode selected is not stored in the storage device, in response to the switching instruction received when the second mode is selected and the second control circuit is allowed to operate.

6. An electronic camera according to claim 2, further comprising:
a storage device in which information indicating the exposure sensitivity having been set most recently with the first mode selected and information indicating contents of an instruction having been most recently issued via the sensitivity setting operation member with the second mode selected are stored, wherein:
(1) the third control circuit selects the second mode instead of the first mode and allows the second control circuit to operate if information indicating the instruction for allowing the second control circuit to operate is stored in the storage device, in response to a switching instruction received from the selection device when the first mode is selected; and
(2) the third control circuit selects the second mode instead of the first mode and sets the most recent exposure sensitivity indicated in the information stored in the storage device as the exposure sensitivity at the imaging device if information indicating the instruction for allowing the second control circuit to operate is not stored in the storage device, in response to the switching instruction received when the first mode is selected.

7. An electronic camera according to claim 2, wherein:
the third control circuit disallows the second control circuit from operating and adjusts the exposure sensitivity from a maximum sensitivity level or a minimum sensitivity level designated as a starting point in response to an instruction for setting the exposure sensitivity output from the sensitivity setting operation member when the second mode is selected and the second control circuit is allowed to operate.

8. An electronic camera according to claim 1, wherein:
the first control circuit adjusts the exposure sensitivity by setting the exposure time period to a predetermined value indicating a higher speed than a lower control limit.

9. An electronic camera according to claim 2, further comprising:
a storage device in which information indicating the exposure sensitivity having been set most recently with the first mode selected and information indicating contents of an instruction having been most recently issued via the sensitivity setting operation member with the second mode selected are stored, wherein:
(1) the third control circuit selects the first mode instead of the second mode and sets one of the most recent exposure sensitivities indicated in the information stored in the storage device and an exposure sensitivity corresponding to the contents of the most recent instruction issued via the sensitivity setting operation member and indicated in the information stored in the storage device, as the exposure sensitivity at the imaging device, in response to a switching instruction received from the selection device when the second mode is selected and the second control circuit is allowed to operate; and
(2) the third control circuit selects first mode instead of the second mode and sets the exposure sensitivity corresponding to the contents of the most recent instruction issued via the sensitivity setting operation member, indicated in the information stored in the storage device, as the exposure sensitivity at the imaging device, in response to the switching instruction received when the second mode is selected and the second control circuit is not allowed to operate.

10. An electronic camera according to claim 2, further comprising:
a storage device in which information indicating the exposure sensitivity having been set most recently with the first mode selected and information indicating contents of an instruction having been most recently issued via the sensitivity setting operation member with the second mode selected are stored, wherein:
(1) the third control circuit selects the second mode instead of the first mode and allows the second control circuit to operate if information indicating the instruction for allowing the second control circuit to operate is stored in the storage device, in response to a switching instruction received from the selection device when the first mode is selected;
(2) the third control circuit selects the second mode instead of the first mode and sets one of the most recent exposure sensitivities indicated in the information stored in the storage device and an exposure sensitivity corresponding to the contents of the most recent instruction issued via the sensitivity setting operation member and indicated in the information stored in the storage device, as the exposure sensitivity at the imaging device if information indicating the instruction for allowing the second control circuit to operate is not stored in the storage device, in response to the switching instruction received when the first mode is selected and the first control circuit is allowed to operate; and
(3) the third control circuit selects the second mode instead of the first mode and sets the most recent exposure sensitivity indicated in the information stored in the storage device as the exposure sensitivity at the imaging device if information indicating the instruction for allowing the second control circuit to operate is not stored in the storage device, in response to the switching instruction received when the first mode is selected and the first control circuit is not allowed to operate.

11. An exposure control method for an electronic camera, comprising:
capturing a subject image through a photographic lens with an imaging device;
detecting subject luminance with a luminance detection device;
selecting one of a first mode in which an exposure calculation is executed by using an exposure sensitivity set at the imaging device and the subject luminance detected by the luminance detection device and a first control exposure is determined through an arithmetic operation with regard to at least one of an exposure time period set at the imaging device and an aperture value set at the photographic lens so as to achieve optimal exposure if the optimal exposure is not achieved through the initial exposure calculation, and a second mode in which a second control exposure is automatically determined through an arithmetic operation with regard to the aperture value and the exposure time period so as to achieve the optimal exposure;

performing a first control for executing the exposure calculation again by adjusting the exposure sensitivity if the first control exposure determined in the first mode does not achieve the optimal exposure;

performing a second control that automatically sets the exposure sensitivity at the imaging device in correspondence to the subject luminance detected by the luminance detection device; and performing a third control that disallows the second control from performing and allows the first control to perform when the first mode is selected, and that disallows the first control from performing and allows the second control to perform when the second mode is selected.

* * * * *